US006944313B1

(12) United States Patent
Donescu

(10) Patent No.: US 6,944,313 B1
(45) Date of Patent: Sep. 13, 2005

(54) METHOD AND DEVICE FOR INSERTING AND DECODING A WATERMARK IN DIGITAL DATA

(75) Inventor: Ioana Donescu, Rennes (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/348,502

(22) Filed: Jul. 7, 1999

(30) Foreign Application Priority Data

Aug. 6, 1998 (FR) .................................. 98 10148
Aug. 6, 1998 (FR) .................................. 98 10149

(51) Int. Cl.$^7$ ............................................. G06K 9/00
(52) U.S. Cl. ..................... 382/100; 382/232; 380/210; 713/176; 348/460
(58) Field of Search ................... 380/210, 252, 380/287, 54; 382/100, 239, 251, 232; 713/176; 704/200.1, 273; 381/703.1; 348/460, 463

(56) References Cited

U.S. PATENT DOCUMENTS

| 5,530,759 | A | | 6/1996 | Braudaway et al. | |
|---|---|---|---|---|---|
| 5,915,027 | A | * | 6/1999 | Cox et al. ..................... | 380/54 |
| 6,163,842 | A | * | 12/2000 | Barton ....................... | 713/176 |
| 6,201,879 | B1 | * | 3/2001 | Bender et al. .............. | 382/100 |
| 6,226,387 | B1 | * | 5/2001 | Tewfik et al. ............... | 382/100 |
| 6,314,192 | B1 | * | 11/2001 | Chen et al. ................. | 382/100 |
| 6,332,030 | B1 | * | 12/2001 | Manjunath et al. ......... | 382/100 |
| 6,359,998 | B1 | * | 3/2002 | Cooklev ...................... | 382/100 |
| 6,370,258 | B1 | * | 4/2002 | Uchida ....................... | 382/100 |
| 6,373,974 | B2 | * | 4/2002 | Zeng .......................... | 382/135 |
| 6,466,209 | B1 | * | 10/2002 | Bantum ...................... | 345/589 |
| 6,535,616 | B1 | | 3/2003 | Hayashi et al. | |

FOREIGN PATENT DOCUMENTS

| EP | 0 766 468 | 4/1997 |
|---|---|---|
| EP | 0 840 513 | 5/1998 |
| EP | 0 855 829 | 7/1998 |

OTHER PUBLICATIONS

"A Digital Watermark Technique based on the Wavelet Transform and its Robustness on Image Compression and Transformation", By H. Inoue, et al., In Proc. Symposium in Cryptography and Information Security, Hamanako, Japan, Jan. 1998.
"A Robust Digital Image Watermarking Mathod Using Wavelet-Based Fusion", by D. Kundur, et al., pp 544-547, In Proc. ICIP, Oct. 1997.
"Phase Watermarking of Digital Images", by J.J.K. O Ruanaidh, et al., pp 239-242, In Proc. ICIP, Lausanne, Sep. 1996.
"Rotation, Scale and Translation Invariant Digital Image Watermarking", by J. J.K. O Ruanaidhn, et al., pp. 536-539, In Proc. ICIP, Oct. 1997.
"A Multiresolution Watermark for Digital Images", by X.G. Xia, et al., pp. 548-551 In Proc. ICIP, Dallas, Texas, Nov. 1997.

(Continued)

Primary Examiner—Samir Ahmed
Assistant Examiner—Anand Bhatnagar
(74) Attorney, Agent, or Firm—Fitzpatrick, Cella, Harper & Scinto

(57) ABSTRACT

A method of inserting a watermark in digital data (I) includes the steps of multi-resolution spectral breakdown (E1) of the digital data (I); extraction (E2) of the components of lowest frequency; choice (E3) of a subset of the components with the lowest frequency; modulation (E4) of the components of said subset in order to insert the supplementary information (S); and reverse multi-resolution spectral recomposition (E5) of the watermarked digital data (I').

42 Claims, 14 Drawing Sheets

OTHER PUBLICATIONS

"On Resolving Rightful Ownerships of Digital Images by Invisible Watermarks", pp. 552-555, In Proc. ICIP, Dallas, Texas, Nov. 1997.

"Embedding Robust Labels Into Images for Copyright Protection", by J. Zhao, et al., In Proc. of the International congress on Intellectual Property for Specialized Information, Knowledge and New Technologies, Vienna, Austria, Aug. 1995.

Hisashi Inoue, et al., "A Digital Watermark Technique Based on the Wavelet Transform and its Robustness on Image Compression and Transformation," The Institute of Electronics, Information and Communication Engineers, The 1998 Symposium on Cryptography and Information Security, Hamanako, Japan, Jan. 28-31, 1998, pp. 1-7.

* cited by examiner

METHOD AND DEVICE FOR INSERTING AND DECODING A WATERMARK IN DIGITAL DATA

The present invention concerns a method and device for inserting a supplementary item of information, such as a secret watermark, in digital data.

It also concerns a method and device for decoding such a supplementary information item inserted by the insertion method according to the invention.

It falls in general terms within the technical field of watermarking of digital data.

The proliferation of exchanges of digitized multimedia data by computer is assisting the creation and distribution of illicit copies and, in general terms, the illegal manipulation of data.

The watermarking of digital data consists of inserting a watermark directly in the digitized data. The insertion of this watermark is like the coding of a supplementary data item in the digital data.

A conventional watermarking consists of inserting a visible logo when the digital data are images. Nevertheless, this watermark is easy to remove for a user who wishes to illegally manipulate this image.

Use is then frequently made of a so-called invisible watermark, which must exhibit the following quality factors:

Said watermark must be imperceptible, that is to say the insertion of such a watermark must preserve the perceptual quality of the digital data, for example the visual quality for images or the auditory quality for audio data. The imperceptibility of the watermark also makes it more difficult to pirate it.

Said watermark must also be indelible, that is to say be statistically undetectable in the watermarked digital data so as to resist intentional attacks for destroying the watermark.

Said watermark must also be robust vis-à-vis conventional processing applied to digital data, such as compression and decompression, digital/analogue conversion, filtering etc.

Finally, said watermark must be reliable, that is to say must allow a reliable decision with regard to the existence or otherwise of a given watermark in given digital data.

The existing insertion methods are used by modifying the high or medium frequencies contained in the digital data, notably when these digital data represent an image. Modifying solely the high frequencies makes it possible to guarantee the invisibility of the inserted watermark. However, such watermarks are little robust vis-à-vis distortions, and in particular do not withstand conventional compressions, which broadly quantize the spectral components of medium or high frequency.

A method of inserting a watermark is known, described in European Patent Application No. 0 766 468 in the name of NEC Corporation, in which a frequency transformation of the digital data is performed before inserting the supplementary information in perceptually significant components. A reverse frequency transformation gives the watermarked digital data. A discrete cosine transformation or a breakdown into sub-bands by a discrete wavelet transformation can be applied to all the digital data, for example an image. Thereafter the N largest frequency components of the transform are modulated in order to insert the supplementary information. Selection of the perceptually significant components is however difficult to implement.

The aim of the present invention is principally to improve the existing insertion methods and to increase the quality of the watermark inserted, notably in terms of imperceptibility and robustness.

According to a first aspect of the invention, a method of inserting a supplementary information item, such as a secret watermark, in digital data includes the following steps:
  multi-resolution spectral breakdown of the digital data;
  extraction of the components of lowest frequency;
  choice of a subset of the components of lowest frequency;
  modulation of the components of said subset in order to insert the supplementary information; and
  reverse multi-resolution spectral recomposition of the watermarked digital data.

Correlatively, a device for inserting a supplementary information item, such as a secret watermark, in digital data includes:
  means for the multi-resolution spectral breakdown of the digital data;
  extraction means adapted to extract components of lowest frequency;
  choosing means for choosing a subset of the components of lowest frequency;
  means of modulating the components of said subset in order to insert the supplementary information; and
  means for the reverse multi-resolution spectral recomposition of the watermarked digital data.

According to this first aspect of the invention, a prior choice is made through the multi-resolution spectral breakdown and the extraction of the components of lowest frequency, which makes it possible to localize the modulatable components automatically in a region of the spectrum, rather than in the entire spectral domain. This is particularly well adapted to the verification of the watermark inserted, for example when it is a case of verifying copyright over a digitized image.

In addition, the prior choice of a spectral sub-band of lowest frequency, in which certain components are modulated in order to introduce the supplementary information, makes it possible to systematically select frequency components which are robust vis-à-vis various digital data compression algorithms and notably vis-à-vis the conventional compression and decompression processing used for digital images.

The Applicant has shown that, whilst it is currently accepted that the low-frequency components allow only very small modulations without significant visual distortion on the reconstructed image, it is possible to add a supplementary information item by inserting a significant power signal on these components in an imperceptible fashion provided that a sufficiently low resolution level is reached during the multi-resolution spectral breakdown.

According to a preferred version of the invention, the multi-resolution spectral breakdown level is predetermined so that the number of components of lowest frequency is between 8×8 and 32×32.

The Applicant showed empirically that a sub-band of this size was particularly well suited to the insertion of a supplementary information item whilst guaranteeing imperceptibility of this supplementary information.

In addition, the methods strictly speaking of inserting the signal representing the supplementary information and detecting this signal will be particularly effective by virtue of the significant reduction in the space which can be modulated with respect to the size of the initial digital data.

According to an advantageous version of the invention, particularly well adapted to the insertion of a watermark in a digital image, at the spectral breakdown step, the spectral breakdown is performed by a discrete wavelet transformation, and, at the extraction step, the components of the approximation sub-band are chosen.

According to another advantageous version of the invention, and as an alternative to the previous version, at the spectral breakdown step, the digital data are broken down iteratively into an approximation version corresponding to a low-pass filtering and a sub-sampling of the digital data or of a previous approximation version, and a detail version corresponding to the subtraction of the approximation version from the digital data or from the previous approximative version, and, at the extraction step, the components of the approximation version are chosen.

This breakdown according to a pyramidal scheme is also particularly well adapted to the breakdown of an image into successive approximation sub-bands and guarantees perfect reconstruction of the image after insertion of the signal representing the supplementary information.

According to a preferred version of the invention, at the modulation step, the components of said subset are modulated by adding a modulation value generated by a pseudo-random function initialized by a digital signal representing the supplementary information to be inserted.

The addition of the supplementary information by means of modulation values generated by a pseudo-random function makes it possible to mask this information and to reinforce its invisibility in order to make pirating of this information more difficult.

According to an advantageous version of the invention, at the choosing step, the subset of components is chosen according to a pseudo-random function initialized by a digital signal representing a confidential key associated with the supplementary information to be inserted.

This confidential key makes it possible to choose the modulatable coefficients in a pseudo-random fashion and to thus make the inserted information more robust vis-à-vis intentional attacks, making its location in the frequency spectrum more difficult to identify. The use of a secret key makes it possible to reinforce the protection of the signal inserted in the digital data.

The invention in its first aspect also concerns a method of decoding, in watermarked digital data, a supplementary information item, such as a secret watermark, inserted in initial digital data according to the insertion method according to the first aspect of the invention, including the following steps:
  multi-resolution spectral breakdown of the watermarked digital data and initial digital data;
  extraction of the components of lowest frequency in the watermarked and initial digital data;
  selection of the subset of components chosen at the choosing step of said method of insertion in the watermarked and initial digital data;
  estimating, by subtraction respectively of the components of said subset of watermarked digital data from the components of said subset of initial digital data, an estimated sequence of modulation values;
  generation of a presupposed sequence of modulation values inserted at the modulation step of said insertion method;
  calculation of a correlation value between the estimated sequence and the presupposed sequence; and
  deciding on the similarity or otherwise of the estimated sequence and presupposed sequence as a function of said correlation value.

This decoding method thus makes it possible to easily find the components of lowest frequency which have been modulated for the insertion of the supplementary information in the digital data and to estimate the inserted modulation in order to compare it with a presupposed modulation. Such a decoding method is particularly well adapted to the recognition of copyright over digital data which have possibly been made noisy during their transmission or storage.

Correlatively, a device for decoding, in watermarked digital data, a supplementary information item, such as a secret watermark, inserted in initial digital data according to the insertion method according to the first aspect of the invention, comprises:
  means of multi-resolution spectral breakdown of the watermarked digital data and initial digital data;
  means of extraction of the components of lowest frequency in the watermarked and initial digital data;
  means of selection of the subset of components chosen at the choosing step of said method of insertion in the watermarked and initial digital data;
  means of estimating, by subtraction respectively of the components of said subset of watermarked digital data from the components of said subset of initial digital data, an estimated sequence of modulation values;
  means of generating a presupposed sequence of modulation values inserted at the modulation step of said insertion method;
  means of calculating a correlation value between the estimated sequence and the presupposed sequence; and
  means of deciding on the similarity or otherwise of the estimated sequence and of the presupposed sequence as a function of said correlation value.

This decoding device has advantages similar to those of the decoding method according to the first aspect of the invention and is particularly well adapted to the recognition of copyright over digital data such as a digital image for example.

According to a preferred version of this first aspect of the invention, which affords a practical and convenient embodiment of the insertion method according to the invention, the means of spectral breakdown, extraction, choosing, modulation and spectral recomposition of the insertion device are incorporated in:
  a microprocessor,
  a read-only memory containing a program for inserting a supplementary information item, and
  a random access memory containing registers adapted to record variables modified during the running of the program.

In a similar fashion, according to a preferred version which affords a practical and convenient embodiment of the decoding method according to the first aspect of the invention, the means of spectral breakdown, extraction, selection, estimation, generation, calculation and decision of the decoding device are incorporated in:
  a microprocessor,
  a read-only memory containing a program for decoding a supplementary information item, and
  a random access memory containing registers adapted to record variables modified during the running of the program.

According to a second aspect of the invention, a method of inserting a supplementary information item, such as a secret watermark, in digital data, comprises the following steps:
  multi-resolution spectral breakdown of the digital data;
  extraction of the components of a frequency sub-band;

spectral transformation of the components of said frequency sub-band;

choice of a subset of coefficients of said spectral transformation;

modulation of the coefficients of said subset in order to insert the supplementary information;

reverse spectral transformation of the coefficients including the subset of modulated coefficients; and reverse multi-resolution spectral recomposition of the watermarked digital data.

Correlatively, a device for inserting a supplementary information item, such as a secret watermark, in digital data, comprises:

means for the multi-resolution spectral breakdown of the digital data;

extraction means adapted to extract components of a frequency sub-band;

means for the spectral transformation of the components of said frequency sub-band;

choosing means for choosing a subset of coefficients of said spectral transformation;

a means of modulating the coefficients of said subset in order to insert the supplementary information;

means for the reverse spectral transformation of the coefficients including the subset of modulated coefficients; and means for the reverse multi-resolution spectral recomposition of the watermarked digital data.

By virtue of this double transformation of the digital data, the seeking of the coefficients to be modulated is implemented on a limited range of frequencies. This is because a prior choice is effected through the multi-resolution spectral breakdown, which makes it possible to locate the modulatable coefficients automatically in a region of the spectrum, and not throughout the entire spectral range. This is particularly well suited to verification of the inserted watermark, for example when it is a case of verifying copyright over a digitized image.

In addition, the prior choice of a modulatable frequency band makes it possible to systematically select frequency components robust to various digital data compression algorithms.

Finally, the application of a spectral transformation to the components of the chosen sub-band guarantees distribution of the supplementary information inserted subsequently over the entire spatial domain of the digital data. In addition, this spectral transformation is performed on a sub-band of the initial digital data, of smaller size. This spectral transformation is therefore much more rapid than in the known methods in which the spectral transformation is performed on all the initial digital data.

According to a preferred version of the invention, at the extraction step, the components of the sub-band of lowest frequency are chosen.

This choice is particularly judicious when it is a case of an image digitized in order to subsequently insert the supplementary information in a spectral range robust to conventional compression and decompression methods.

According to an advantageous version, particularly well adapted to the insertion of a watermark in a digital image, at the spectral breakdown step, the spectral breakdown is effected by a discrete wavelet transformation, and, at the extraction step, the components of the approximation sub-band are chosen.

The Applicant has shown, whilst it is currently accepted that the approximation sub-band, corresponding to the lowest frequencies, affords only very small modifications without significant visual distortions on the reconstructed image, that it is possible to add a supplementary information item on the components of the approximation sub-band in an imperceptible fashion provided that a sufficiently low resolution level is reached during the multi-resolution spectral breakdown.

Preferably, the wavelet transformation breakdown level is predetermined so that the number of components of the approximation sub-band is between 8×8 and 32×32.

The Applicant showed empirically that a sub-band of this size was particularly well suited to the insertion of a supplementary information item whilst guaranteeing imperceptibility of this supplementary information.

According to a preferred version of the invention, the spectral transformation is a discrete cosine transform.

The use of such a spectral transformation is particularly well adapted to the insertion of a watermark in an image and guarantees good distribution throughout the entire spatial domain of the inserted watermark.

According to a preferred version of the invention, at the modulation step, the coefficients of said subset are modulated by adding a modulation value generated by a pseudo-random function initialized by a digital signal representing the supplementary information to be inserted.

The addition of the supplementary information by means of modulation values generated by a pseudo-random function makes it possible to mask this information and to reinforce its invisibility in order to make pirating of this information more difficult.

According to an advantageous version of the invention, at the choosing step, the subset of coefficients is chosen according to a pseudo-random function initialized by a digital signal representing a confidential key associated with the supplementary information to be inserted.

This confidential key makes it possible to choose the modulatable coefficients in a pseudo-random fashion and thus to make the inserted information more robust to intentional attacks by making it more difficult to find its location in the frequency spectrum.

According to a preferred version of this second aspect of the invention, which affords a practical and convenient embodiment of the insertion method according to the invention, the means of spectral breakdown, extraction, spectral transformation, choosing, modulation, reverse spectral transformation and spectral recomposition of the insertion device are incorporated in:

a microprocessor, a read-only memory containing a program for inserting a supplementary information item, and a random access memory containing registers adapted to record variables modified during the running of the program.

In association with this insertion method, the present invention according to its second aspect also relates to a method of decoding, in watermarked digital data, a supplementary information item, such as a secret watermark, inserted in initial digital data according to said insertion method, including the following steps:

multi-resolution spectral breakdown of the watermarked digital data and initial digital data;

extraction of the components of a sub-band of frequencies respectively in the watermarked and initial digital data;

spectral transformation of the components of the frequency sub-band of the watermarked digital data and initial digital data.

selection of the subset of coefficients chosen at the choosing step of said method of insertion in the watermarked digital data and initial digital data;

estimating, by subtraction respectively of the coefficients of said subset of watermarked digital data from the coefficients of said subset of initial digital data, an estimated sequence of modulation values;

generation of a presupposed sequence of modulation values inserted at the modulation step of said insertion method;

calculation of a value of correlation between the estimated sequence and the presupposed sequence; and deciding on the similarity or otherwise of the estimated sequence and presupposed sequence as a function of said correlation value.

Correlatively, a device for decoding, in watermarked digital data, a supplementary information item, such as a secret watermark, inserted in initial digital data according to the insertion method according to the second aspect of the invention, comprises:

means of multi-resolution spectral breakdown of the watermarked digital data and initial digital data;

means of extraction of the components of a sub-band of frequencies respectively in the watermarked and initial digital data;

means for the spectral transformation of the components of the frequency sub-band of the watermarked digital data and initial digital data;

means of selection of the subset of coefficients chosen at the choosing step of said method of insertion in the watermarked and initial digital data;

means of estimating, by subtraction respectively of the coefficients of said subset of watermarked digital data from the coefficients of said subset of initial digital data, an estimated sequence of modulation values;

means of generating a presupposed sequence of modulation values inserted at the modulation step of said insertion method;

means of calculating a value of correlation between the estimated sequence and the presupposed sequence; and means of deciding on the similarity or otherwise of the estimated sequence and of the presupposed sequence as a function of said correlation value.

By virtue of the double transformation of the digital data, the search for the modulated coefficients is implemented over a limited frequency range. This is because the prior choice effected through the multi-resolution spectral breakdown makes it possible to locate the modulatable coefficients automatically in a region of the spectrum.

This decoding method and device are particularly well adapted to the verification of the inserted watermark, for example when it is a case of verifying copyright over a digitized image.

According to a preferred version of this second aspect of the invention which affords a practical and convenient embodiment of the decoding method according to the invention, the means of spectral breakdown, extraction, spectral transformation, selection, estimation, generation, calculation and decision of the decoding device are incorporated in:
a microprocessor,
a read-only memory containing a program for decoding a supplementary information item, and
a random access memory containing registers adapted to record variables modified during the running of the program.

A means of storing information, which can be read by a computer or by a microprocessor, integrated or not into an insertion or decoding device, optionally removable, stores a program implementing the method of inserting or decoding a supplementary information item according to the first and/or second aspect of the invention.

The present invention also relates to a digital signal processing appliance having means adapted to implement the insertion or decoding method according to the first and/or second aspect of the invention, or having an insertion or decoding device according to the first and/or second aspect of the invention.

The advantages of this processing appliance are identical to those disclosed above in relation to the insertion method and device and the decoding method and device according to the first and/or second aspect of the invention.

The insertion method and the decoding method can be implemented particularly in a digital photographic apparatus, a digital camera, a database management system, a computer, a scanner or a medical imaging apparatus, notably an X-ray radiography apparatus.

Correlatively, a digital photographic apparatus, a digital camera, a database management system, a computer, a scanner or a medical imaging apparatus, notably an X-ray radiography apparatus, have an insertion device and/or a decoding device according to the invention.

Said digital photographic apparatus, digital camera, database management system, computer, scanner and medical imaging apparatus such as an X-ray radiography apparatus have advantages similar to those of the insertion and decoding methods and devices according to the invention.

Other particularities and advantages of the invention will also emerge from the following description.

In the accompanying drawings, given by way of non-limitative examples:

A description will be given first of all of a device for inserting a supplementary information item in digital data.

In the following example, and by way of non-limitative example, the digital data consist of a series of digital samples representing an image I. The image I is for example represented by a series of bytes, each byte value representing a pixel of the image I, which can be a black and white image, with 256 grey levels.

The supplementary information is a secret watermark which it is wished to insert in the image I in an imperceptible and robust fashion. This secret watermark can for example make it possible to identify the author or owner of the image I. This supplementary information is composed in this example of an identification number S in a certain number of bits, for example 32 bits, associated with a confidential key K, also defined in a certain number of bits. This identification number S and confidential key K will make it possible to create, as described below, a modulation signal which will effectively be inserted into the image I. The confidential key K can be associated in an arbitrary fashion with the identification number S.

Figure 1:
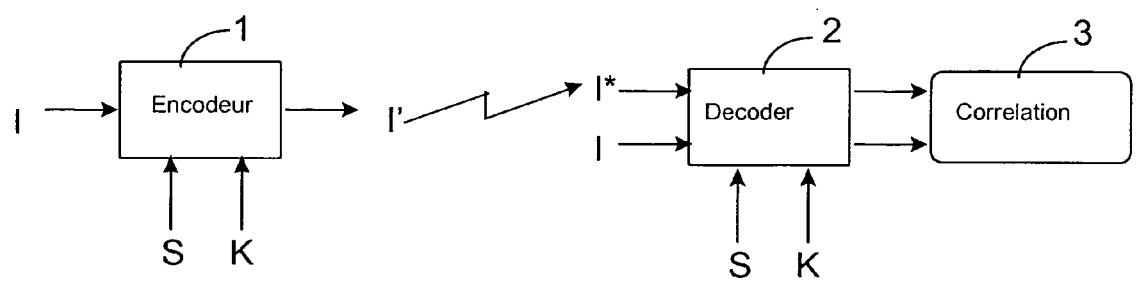
FIG. 1 is an outline diagram illustrating the insertion of a supplementary information item in a digital signal.

In general terms, and as illustrated in FIG. 1, an insertion device is similar overall to an encoder 1, which codes, in an image I, a watermark defined from S and K. A watermarked image I' is supplied to the output of the encoder 1.

This image I' can undergo a certain number of processings similar to the addition of non-linear noise, such as a compression and decompression, with or without loss, in order to be transmitted or stored, or a digital to analogue conversion in order to be displayed, or a filtering.

After processing, the image I*, which corresponds to a noisy version of the watermarked image I', can be transmitted to a decoder 2 associated with the encoder 1. This decoder 2 will estimate, in a conventional fashion, from the original image I and the supplementary information S, K inserted, the inserted modulation signal W* in the noisy image I*. This modulation signal W* in the noisy image I* will be supplied to a detector 3, as well as the modulation signal W inserted in the image I, in order to evaluate the degree of similarity between these two signals W and W* and thus to check the copyright information for example which has been inserted. This correlation measurement will be described in detail in the remainder of the description with reference to the decoding device and method.

Figure 2:
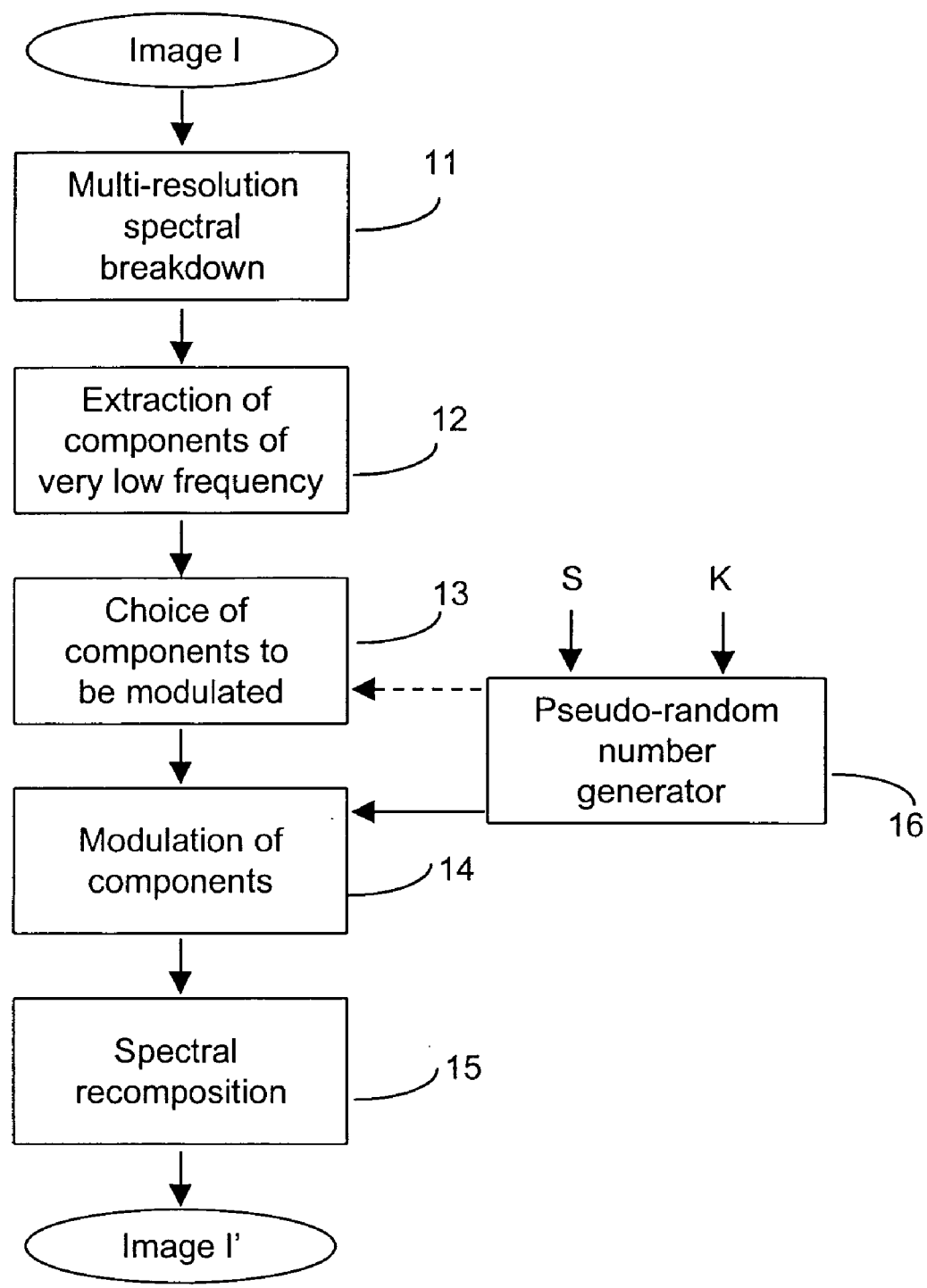
FIG. 2 is a block diagram illustrating an insertion device according to one embodiment of the invention according to a first aspect.

In accordance with a first aspect of the invention, and as illustrated in FIG. 2, the insertion device 1 has:

means 11 for the multi-resolution spectral breakdown of the digital data representing in this example an image I;

extraction means 12 adapted to extract components of lowest frequency;

choosing means 13 for choosing a subset of the components of lowest frequency;

means 14 of modulating the components of this subset in order to insert the supplementary information; and means 15 for the reverse multi-resolution spectral recomposition of the digital data in order to reconstitute a watermarked image I'.

Figure 3:
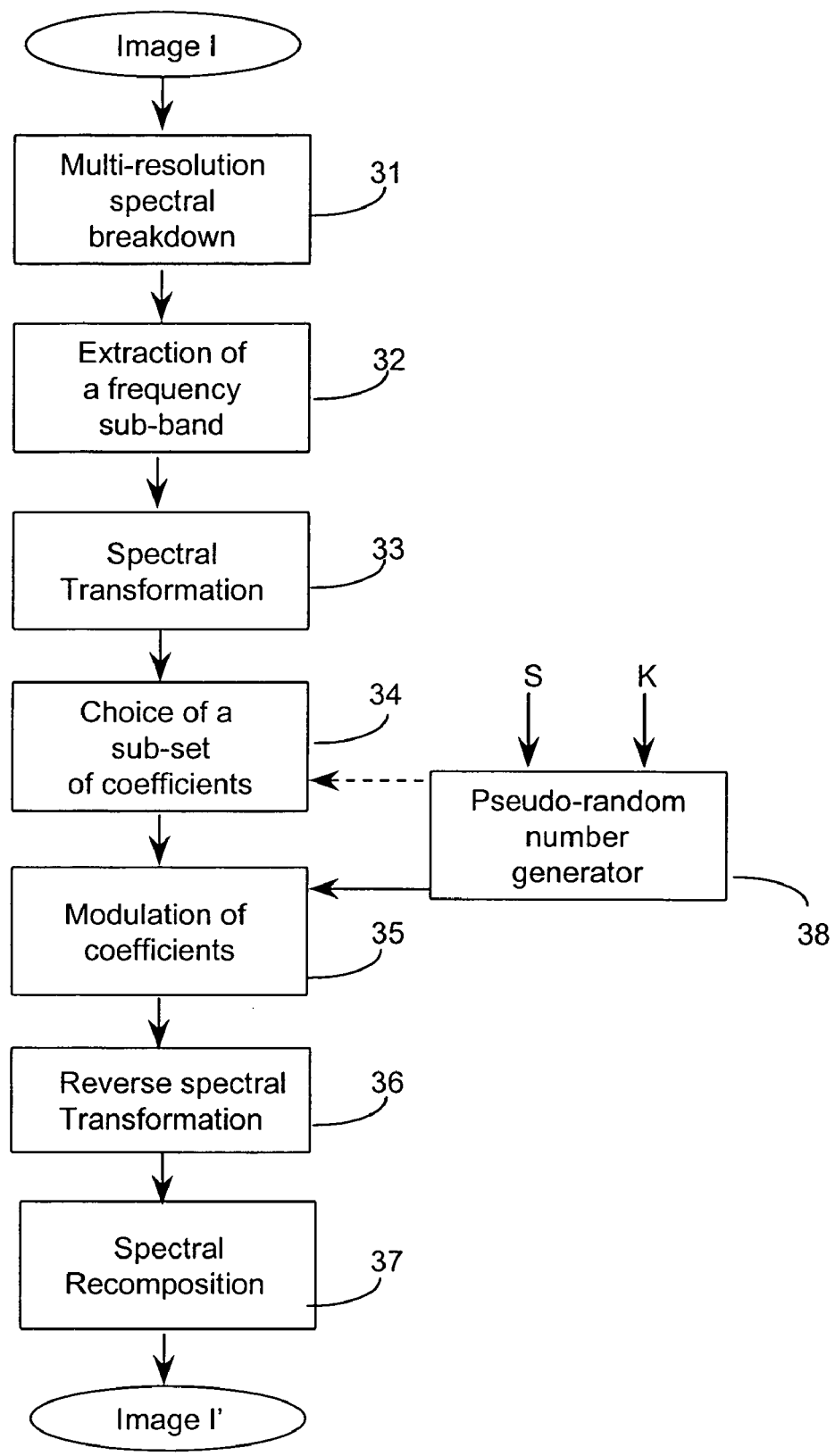
FIG. 3 is a block diagram illustrating an insertion device according to one embodiment of the invention according to a second aspect.

In accordance with a second aspect of the invention, and as illustrated in FIG. 3, the insertion device 1 has:

means 31 for the multi-resolution spectral breakdown of the digital data representing in this example an image I;

extraction means 32 adapted to extract components of a frequency sub-band;

means for the spectral transformation 33 of the components of this frequency sub-band;

choosing means 34 for choosing a subset of the coefficients of the spectral transformation;

means 35 of modulating the coefficients of this subset in order to insert the supplementary information;

means for the reverse spectral transformation 36 of the coefficients including the subset of modulated coefficients; and means 37 for the reverse multi-resolution spectral recomposition of the digital data in order to reconstitute a watermarked image I'.

Preferably, the multi-resolution spectral breakdown means 11, 31 are adapted to perform a discrete wavelet transformation and consist of a circuit for breaking down into sub-bands, or analysis circuit, formed by a set of analysis filters, respectively associated with decimators by two. This breakdown circuit filters the signal of the image I in two directions, into sub-bands of spatial high frequencies and low frequencies. The circuit has several successive analysis units for breaking the image I down into sub-bands according to several resolution levels.

Conventionally, the resolution of a signal is the number of samples per unit length used for representing this signal. In the case of an image signal I, the resolution of a sub-band is related to the number of samples per unit length used for representing this sub-band horizontally and vertically. The resolution depends on the number of decimations performed, the decimation factor and the resolution of the initial image.

Figure 5:
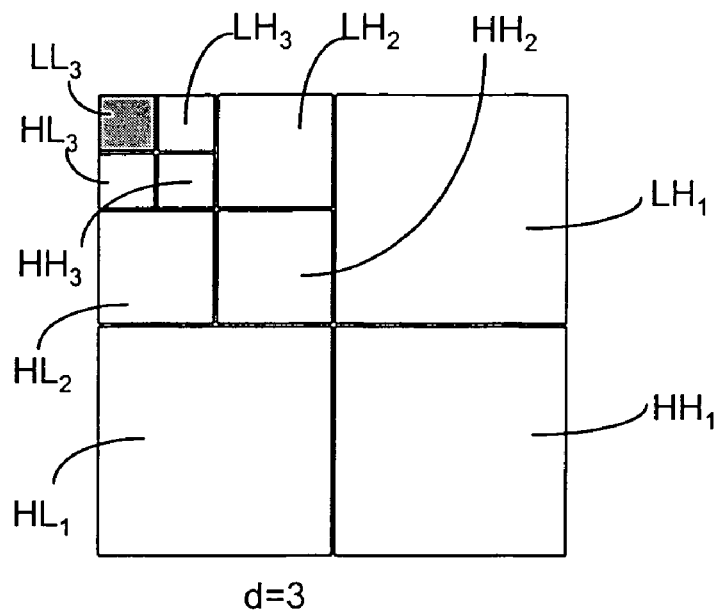
FIG. 5 illustrates schematically a first method of breaking down an image into sub-bands.

This breakdown into sub-bands is well known and the different analysis steps used will be stated briefly below, with reference to FIG. 5, in the case of an image I broken down into sub-bands at a breakdown level d equal to 3.

A first analysis unit receives the image signal I and filters it through two digital filters, respectively low-pass and high-pass, in a first direction, for example horizontal. After passing through decimators by two, the resulting filtered signals are in turn filtered by two filters, respectively low-pass and high-pass, in a second direction, for example vertical. Each signal is once again passed through a decimator by two. At the output of this first analysis unit, four sub-bands $LL_1$, $LH_1$, $HL_1$ and $HH_1$ with the highest resolution in the breakdown are then obtained.

The sub-band $LL_1$ includes the components of low frequency in both directions of the image signal I. The sub-band $LH_1$ includes the components of low frequency in a first direction and high frequency in a second direction of the image signal I. The sub-band $HL_1$ includes the components of high frequency in the first direction and the components of low frequency in the second direction. Finally, the sub-band $HH_1$ includes the components of high frequency in both directions.

A second analysis unit in its turn filters the sub-band $LL_1$ in order to supply, in the same way, four sub-bands $LL_2$, $LH_2$, $HL_2$ and $HH_2$ with an intermediate resolution level in the breakdown. Finally, in this example, the sub-band $LL_2$ is in its turn analyzed by a third analysis unit in order to supply four sub-bands $LL_3$, $LH_3$, $HL_3$ and $HH_3$ with the lowest resolution in this breakdown.

In this way ten sub-bands and three resolution levels are obtained. The sub-band with the lowest frequency $LL_3$ is referred to as the approximation sub-band and the other sub-bands are detail sub-bands.

Naturally, the number of resolution levels, and consequently of sub-bands, can be chosen differently, and can for example be equal to four resolution levels with thirteen sub-bands.

The extraction means 12, 32 are next adapted to choose the components of the sub-band with the lowest frequency in the breakdown of the image I, that is to say, in this example, the approximation sub-band $LL_3$.

Insertion of the watermark S will thus be performed in the low-frequency sub-band, which is generally little quantized in the image compression and decompression processings, so that the robustness of the inserted watermark vis-à-vis the distortions which the image undergoes is reinforced.

The Applicant has found that it is possible to add information into the approximation sub-band imperceptibly provided that a sufficiently low resolution level is reached.

It is then necessary to adjust the number d of breakdown levels according to the size of the image I. This is because, for an image I of size N×N, the sub-band of very low frequency is in this example of size $N/2^d \times N/2^d$.

Preferably, the number d of levels of breakdown by transformation into wavelets is predetermined so that the number n of components of the approximation sub-band $LL_d$ is between 8×8 and 32×32.

According to tests, it turns out that it is preferable to have n=16×16, which corresponds to five breakdown levels when the image I has a size N×N=512×512.

The components $I_{ij}$ with $0 \leq i \leq N/2\ d^{-1}$ and $0 \leq j \leq N/2^d - 1$ of the approximation sub-band $LL_5$ are thus extracted.

Figure 6:
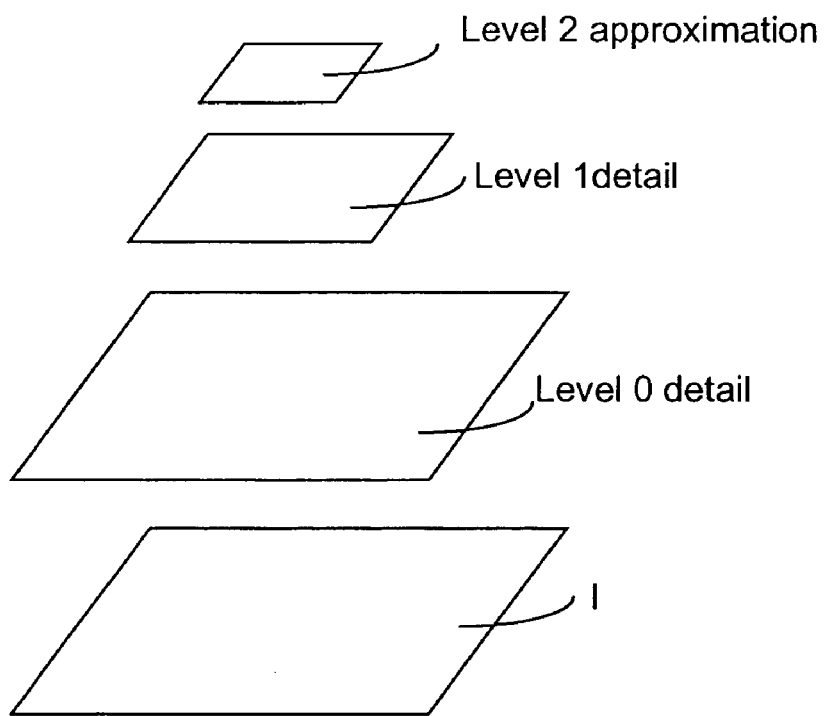
FIG. 6 illustrates schematically a second method of breaking down an image into sub-bands.

By way of variant, and according to another embodiment of the present invention illustrated in FIG. 6, the digital data I are broken down iteratively into an approximation version corresponding to a low-pass filtering and a sub-sampling of the digital data I or of a previous approximation version, and into a detail version corresponding to the subtraction of the approximation version from the digital data or from the previous approximation version. Such a scheme of successive pyramidal approximation is proposed by Burt and Adelson in "The Laplacian pyramid as a compact image code", IEEE, Trans. on Communications, 31(4): 532–540, 1983. This scheme consists of extracting a low-resolution version of the image I under consideration by low-pass filtering and sub-sampling by a factor equal to two in each direction, horizontal and vertical. In this way a level 1 approximation is obtained. The level 0 detail image, of the same size as the original image I, is produced by the subtraction of the level 1 approximation from the original image I. In order to effect this subtraction, first of all there is predicted, by interpolation of the low-resolution version, an image with an identical size to the original image, and secondly this predicted image is subtracted from the original image in order to obtain the detail image. This scheme can be iterated as many times as necessary on the low-resolution image in order to obtain a sufficiently simplified approximation of the image and allow an invisible insertion of the supplementary information into the approximation version. Here, the breakdown is reiterated on the level 1 approximation version, which is in its turn broken down into a level 2 approximation version and a level 1 detail version. Next, at the extraction step, the version with the lowest resolution is chosen, here the level 2 approximation version, also formed by a set of components $I_{ij}$, with i and j varying respectively over the length of the level 2 approximation image in a first and a second direction.

In the first aspect of the invention, the means 13 of choosing a subset of components $I_{ij}$ cooperate with a number generator 16 in a pseudo-random function initialized by the digital signal K representing a confidential key associated with the supplementary information S to be inserted.

Drawing numbers according to a pseudo-random function makes it possible to reinforce the robustness of the inserted watermark by choosing the components to be modulated in a pseudo-random fashion. Only knowledge of the confidential key and of the pseudo-random function used makes it possible to find the very low frequency components which have been modulated.

Likewise, the modulation means 14 cooperate with the generator 16 of modulation values generated by a pseudo-random function initialized by a digital signal S representing additional information to be inserted and having means 15 of adding the modulation values to the components of the previously chosen subset.

The spectral recomposition means 15 have a conventional recomposition circuit comprising a series of synthesis filters associated with multipliers by two, so that, after several recomposition levels, in this example equal to three, a watermarked image I' is supplied at the output of the coder 1.

In the second aspect of the invention, the spectral transformation means 33 are adapted to effect a discrete cosine transform or DCT.

This DCT transformation, used conventionally in image processing, is here used effectively because of its restriction to a small sub-band of the image I. This DCT transformation makes it possible subsequently to obtain a distribution of the inserted watermark S throughout the spatial domain of the image I.

The means 34 of choosing a subset of coefficients cooperate with a number generator 38 in a pseudo-random function initialized by the digital signal K representing a confidential key associated with the supplementary information S to be inserted.

Drawing pseudo-random numbers makes it possible to reinforce the robustness of the inserted watermark by choosing the coefficients of the DCT to be modulated in a random fashion. Only knowledge of the confidential key and of the pseudo-random function used makes it possible to find the coefficients of the DCT which have been modulated.

Likewise, the modulation means 35 cooperate with the generator 38 of modulation values generated by a pseudo-random function initialized by a digital signal S representing additional information to be inserted and having means 35 of adding the modulation values to the coefficients of the previously chosen subset.

The reverse spectral transformation means 36 are in this example a reverse discrete cosine transformation used normally in image processing.

Likewise, the spectral recomposition means 37 include a conventional recomposition circuit comprising a series of synthesis filters associated with multipliers by two, so that, after several recomposition levels, in this example equal to 3, a watermarked image I' is supplied at the output of the coder 1.

Figure 4:
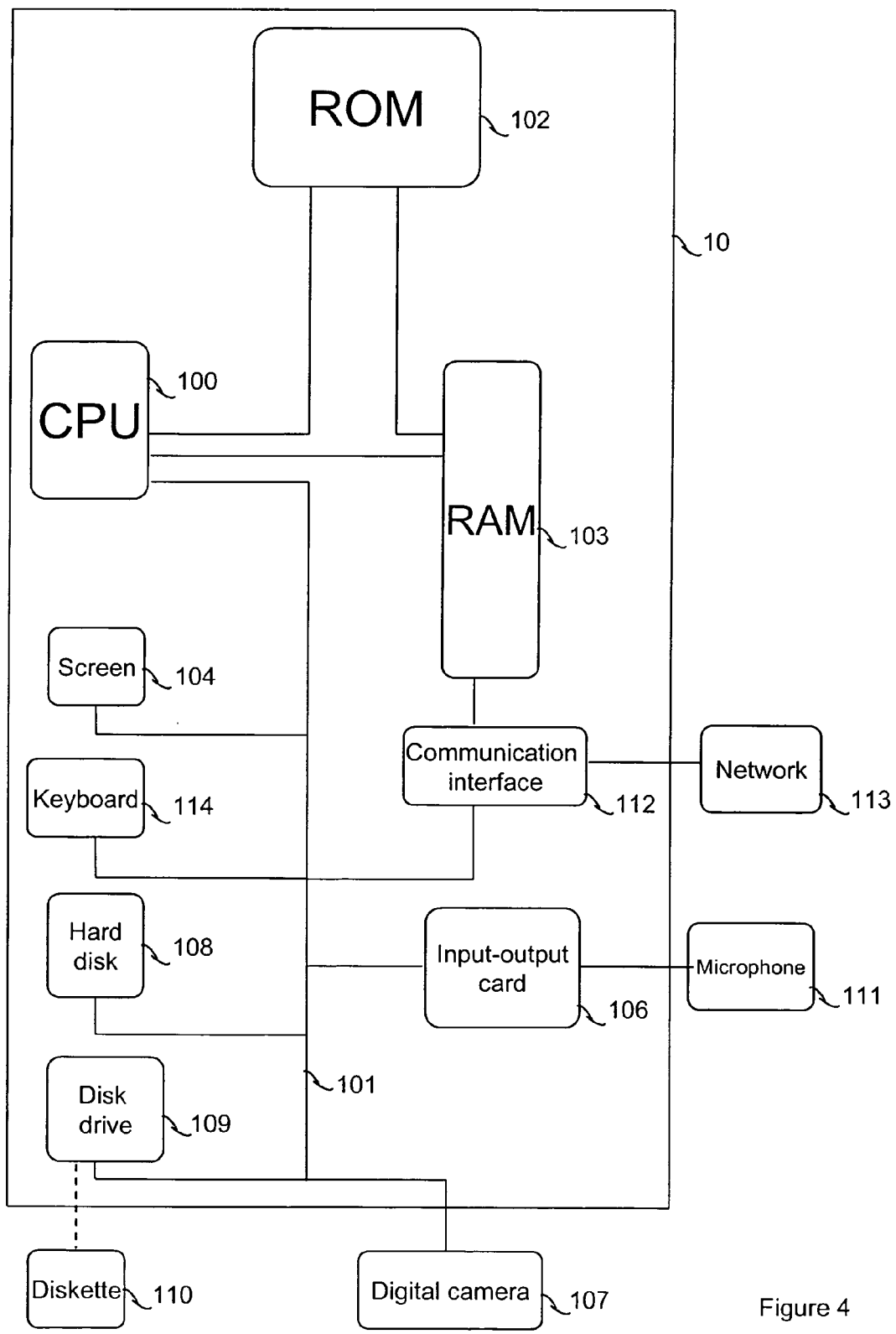
FIG. 4 is a block diagram illustrating a digital signal processing device adapted to implement the methods according to the invention.

Preferably, and as illustrated in FIG. 4, the means of spectral breakdown 11, extraction 12, choosing 13, modulation 14 and spectral recomposition 15, as well as the pseudo-random number generator 16, are incorporated in a microprocessor or computer 10, a read-only memory 102 (ROM) containing the program for inserting a supplementary information item S, and a random access memory 103 (RAM) containing registers adapted to record variables modified during the running of the program.

Likewise, the means of spectral breakdown 31, extraction 32, spectral transformation 33, choosing 34, modulation 35 and reverse spectral transformation 36 and spectral recomposition 37, as well as the pseudo-random number generator 38, are incorporated in a microprocessor or computer 10, a read-only memory 102 (ROM) containing the program for inserting a supplementary information item S, and a random access memory 103 (RAM) containing registers adapted to record variables modified during the running of the program.

Naturally, the program for inserting a supplementary information item can be stored in a hard disk 108 of the computer 10.

This insertion program can also be stored in whole or in part on a storage means which is removable and not integrated into the computer proper. Thus this insertion program can be received and loaded in the read-only memory 102 or hard disk 108 by means of a communication network 113 connected to the computer by means of a communication interface 112. It can also be envisaged that the program be loaded by means of a disk drive 109 adapted to read the program instructions previously stored on a diskette 110. Naturally, the diskettes can be replaced by any information medium such as a fixed-memory compact disc (CD-ROM), a magnetic tape or a memory card.

A central unit 100 (CPU) makes it possible to execute the instructions of the insertion program. Thus, on powering-up, the program stored in one of the non-volatile memories, for example the read-only memory 102, is transferred into a random access memory (RAM) 103, which will also contain the variables necessary for implementing the insertion method according to the first and second aspects of the invention.

The random access memory 103 can contain notably several registers for storing the variables modified during the running of the program. Thus it has, by way of example, a register for storing the size of the approximation sub-band at each breakdown level, a register for storing the pseudo-random number drawn in order to determine the components to be modulated, a register for storing the subset of components chosen, a register for storing the modulation values and a register for storing the modulated components.

A communication bus 101 in a conventional fashion affords communication between the different sub-elements of the computer.

The computer 10 also has a screen 104 for displaying for example the image I to be watermarked and to serve as an interface with the user, who will be able to parameterize certain data for implementing the insertion method, using the keyboard 114 for example.

The supply of data, in which it is wished to insert a secret watermark, for example in order to identify their author, to the computer 10, can be performed by different peripherals and notably a digital camera 107 connected to a graphics card, or a scanner, an X-ray radiography apparatus or any other image acquisition or storage means.

The communication network 113 can also be adapted to supply a digital image to be watermarked. The diskette 110 can likewise contain digital data.

By way of variant, a microphone 111 is connected to the computer 10 by means of an input-output card 106. The digital data to be watermarked will in this variant be an audio signal.

This insertion device can also be incorporated in any type of digital processing apparatus, directly in a digital photographic apparatus or a digital camera, or be integrated into a database management system in order to watermark the digital data stored or processed.

The insertion method according to the first aspect of the invention will now be described with reference notably to FIGS. 7 and 8.

According to the invention, the method of inserting a supplementary information item S, such as a secret watermark, in digital data, here an image I, includes the following steps:

a) multi-resolution spectral breakdown E1 of the digital data I;

b) extraction E2 of the components of lowest frequency.

The insertion method is here applied, by way of example, to an image I of size N×N with N=512 bytes.

Figure 7:
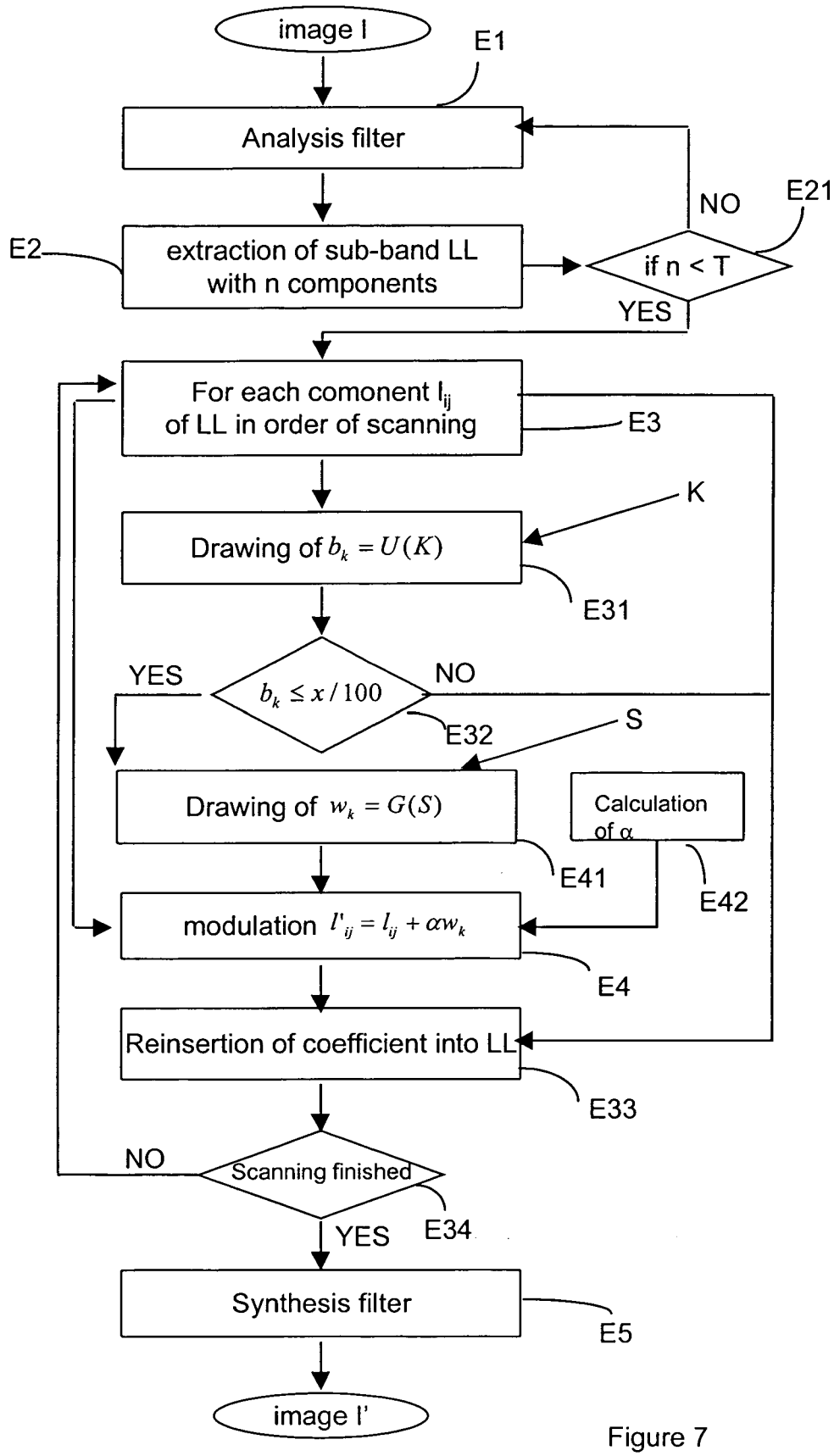
FIG. 7 is an algorithm for inserting a supplementary information item in an image according to a first embodiment of the first aspect of the invention.

The spectral breakdown E1 is effected in the embodiment of FIG. 7 by means of a transformation into discrete wavelets. The number d of levels of breakdown by a discrete wavelet transformation is predetermined so that the number n of components of the approximation sub-band LL is between 8×8 and 32×32.

In this way a threshold value T is fixed, for example 32×32, and, at each breakdown level, the number n of components of the approximation sub-band LL is compared with this threshold value T during a test step E21.

If the test is negative, that is to say n is greater than the threshold value T, the sub-band is broken down at a higher breakdown level.

In this example, where the image I is square and with a size equal to 512×512 bytes, a breakdown into sub-bands with decimators by two is used. The size of the sub-band LL, also square, is, at each breakdown level d, equal to $N/2^d \times N/2^d$.

By fixing a threshold value T at 32×32, a sub-band LL of suitable size for a breakdown level d equal to 4 is obtained.

At step E2, the approximation sub-band $LL_4$ of lowest frequency formed by the components $I_{ij}$ is consequently chosen, with $0 \leq i \leq N/2^d - 1$ and $0 \leq j \leq N/2^d - 1$.

Figure 8:
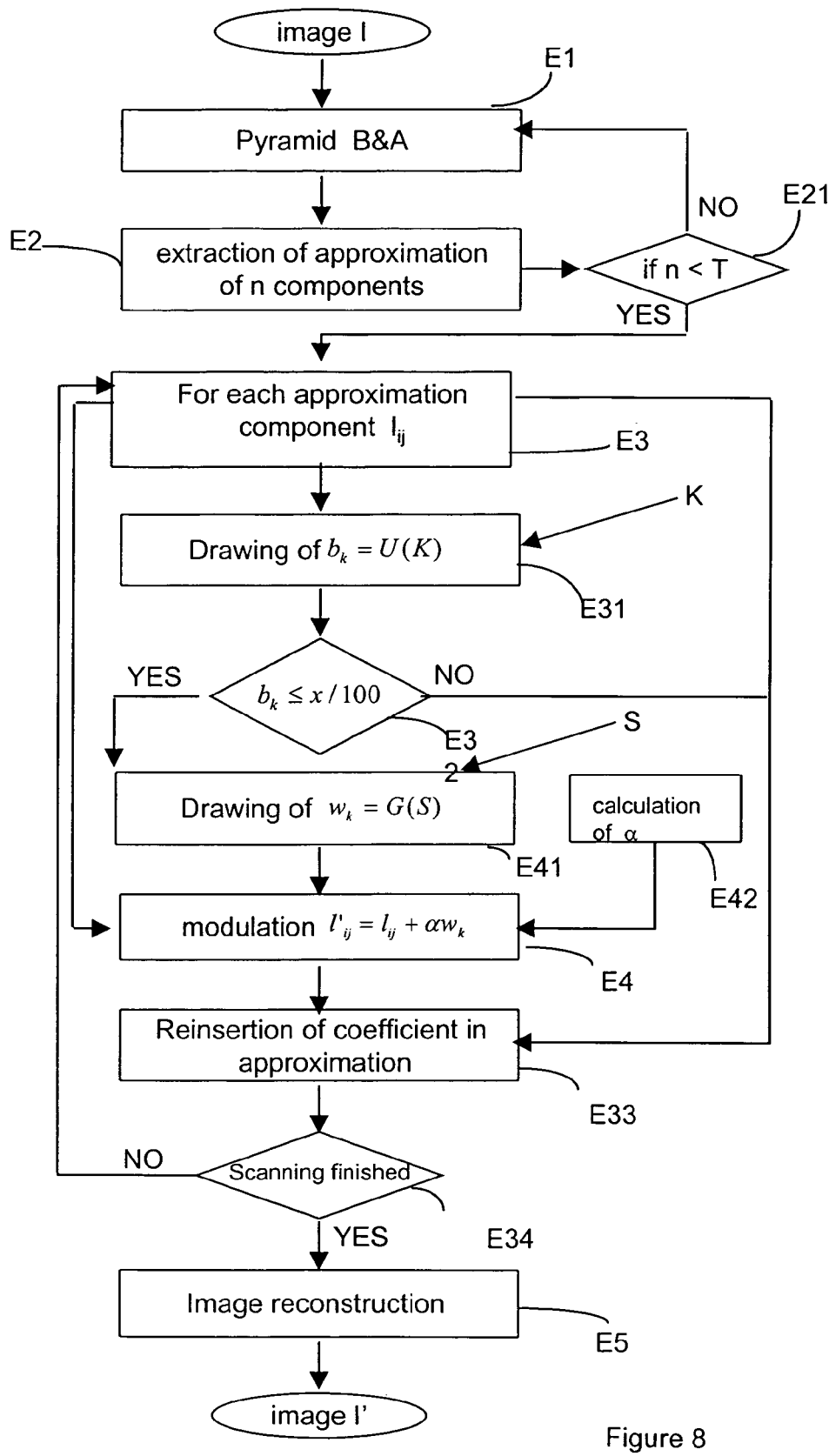
FIG. 8 is an algorithm for inserting a supplementary information item in an image according to a second embodiment of the first aspect of the invention.

Alternatively, in the embodiment illustrated in FIG. 8, the image signal I is broken down by a breakdown of the pyramid type as described above with reference to FIG. 6. At each breakdown level, at step E21, the number n of components of the approximation obtained is compared with the threshold value T, fixed for example at 32×32, in order to determine, in the same way as for the discrete wavelet transformation, whether the size of the approximation is sufficiently small or whether the breakdown must be reiterated at a higher level.

In a step E3, in accordance with the invention a subset of components $I_{ij}$ of the sub-band of very low frequency extracted is chosen. The components to be modulated are thus chosen in a restricted spectral region.

In these example embodiments, for the modulation, a degree of coverage of x % of the sub-band of very low frequency extracted is fixed. For example, x=80 is chosen.

In this example, the subset of components is chosen according to a pseudo-random function initialized by a digital signal K representing a confidential key associated with the supplementary information S to be inserted.

An order of scanning of the components $I_{ij}$ is defined. When these components are in a matrix of size $N/2^d \times N/2^d$, the order of video scanning is chosen for example in a zigzag from the top left corner to the bottom right corner.

For each component $I_{ij}$, at step E31 a drawing is carried out according to a predetermined uniform law U, such as a uniform law U on the interval [0,1], initialized by K, so that a pseudo-random number $b_k=U(K)$ between 0 and 1 is obtained.

In a known fashion, a uniform law U on this interval consists of a series of real numbers, uniformly distributed over the interval]0,1], each interval number having the same probability of occurrence. To each initialization value K there corresponds a given series of real numbers: this initialization value K can be likened to a secret key, knowledge of which makes it possible to identically reconstitute the series of real numbers.

At each drawing of $b_k$, that is to say for each successive value of the series of real numbers defined by the uniform law U, this number $b_k$ is compared with the degree of coverage x/100 in a test step E32. If $b_k$ is less than x/100, here equal to 0.8, the associated component $I_{ij}$ is adopted in order to be modulated. On the other hand, if the number $b_k$ is greater than 0.8, the associated component $I_{ij}$ is now unchanged and reinserted in the very low frequency sub-band at a step E33.

In this particular example, the proportion of components $I_{ij}$ which are modulated is equal statistically to four fifths of the very low frequency components extracted at step E2.

Naturally, without a confidential key K, the choice of the components to be modulated can be made systematically, for example by choosing four coefficients out of five in the running order. It is also possible to choose the largest coefficients in magnitude or the first coefficients in the zigzag running order of the very low frequency sub-band.

Still according to the invention, the components $I_{ij}$ of the subset chosen are modulated at step E4 by adding a modulation value generated by a pseudo-random function in a step E41 initialized by the digital signal S representing the additional information to be inserted.

A Gaussian law G(0,1) is used by way of example, initialized in the pseudo-random number generator 16 by the signal to be inserted S.

At step E41, a modulation value $w_k=G(S)$ is drawn for each component $I_{ij}$ to be modulated, the index k corresponding to the $k^{th}$ component $I_{ij}$ to be modulated in the predefined scanning order. To each initialization signal S there corresponds a unique predetermined series of modulation values $w_k$ with a mean equal to 0 and a standard deviation equal to 1.

A correction coefficient $\alpha$ is calculated at step E42. This coefficient $\alpha$ can be constant for all the components $I_{ij}$ to be modulated and can typically be equal to 1. It ensures invisibility of the inserted information S.

Modulation of each component $I_{ij}$ is obtained by adding, at step E4, the modulation value:

$$I'_{ij}=I_{ij}+\alpha w_k$$

The choice of a constant correction coefficient $\alpha$ is sufficient in these example embodiments using a breakdown into wavelets or a breakdown of the pyramidal type, given that the components $I_{ij}$ have comparable orders of magnitude.

The correction coefficient $\alpha$ could also be dependent on the components $I_{ij}$, so that the modulation of each component $I_{ij}$ is obtained by adding, at step E4, the modulation value:

$$I'_{ij}=I_{ij}+\alpha_{ij}w_k$$

The coefficient $\alpha_{ij}$ can be weighted according to the value of the modulated component so that $\alpha_{ij}=0.1\times I_{ij}$.

The coefficient $\alpha_{ij}$ can also correspond to the mean of the values $I_{ij}$ close to the modulated component.

It can also take account of the local visibility limit in order to provide a psychovisual masking so that the modulation of the components for inserting the secret watermark does not exceed the maximum visually acceptable distortion.

The modulated components $I'_{ij}$ are next reinserted at step E33 into the components of very low frequency in place of the initial components $I_{ij}$.

A test is performed at step E34 in order to check whether all the components $I_{ij}$ of very low frequency have been scanned.

In the negative, the following component $I_{ij}$ in the scanning order is considered and the process is reiterated as from step E3 by drawing a new pseudo-random number $b_k$ in order to determine whether this component $I_{ij}$ is to be modulated.

When the scanning is terminated, a last reverse multi-resolution spectral recomposition step E5 reconstructs the watermarked image I'.

In the example embodiment in FIG. 7, synthesis filters are used for implementing a reverse wavelet transformation.

In the example in FIG. 8, the watermarked image I' is reconstructed from versions of successive approximations and details.

By virtue of the insertion method according to the first aspect of the invention, the inserted watermark S in the image I' is much more robust vis-à-vis subsequent processings of the image I'. In addition, the inserted modulation is limited to a band of frequencies and checking of the inserted watermark will be much more rapid to effect.

The decoding of the inserted watermark in this first aspect of the invention will now be described with reference particularly to FIGS. 9 to 11.

The decoder 2 (see FIG. 1) receives a noisy image I* and it also has available the original image I as well as the information S associated with the confidential key K.

Figure 9:
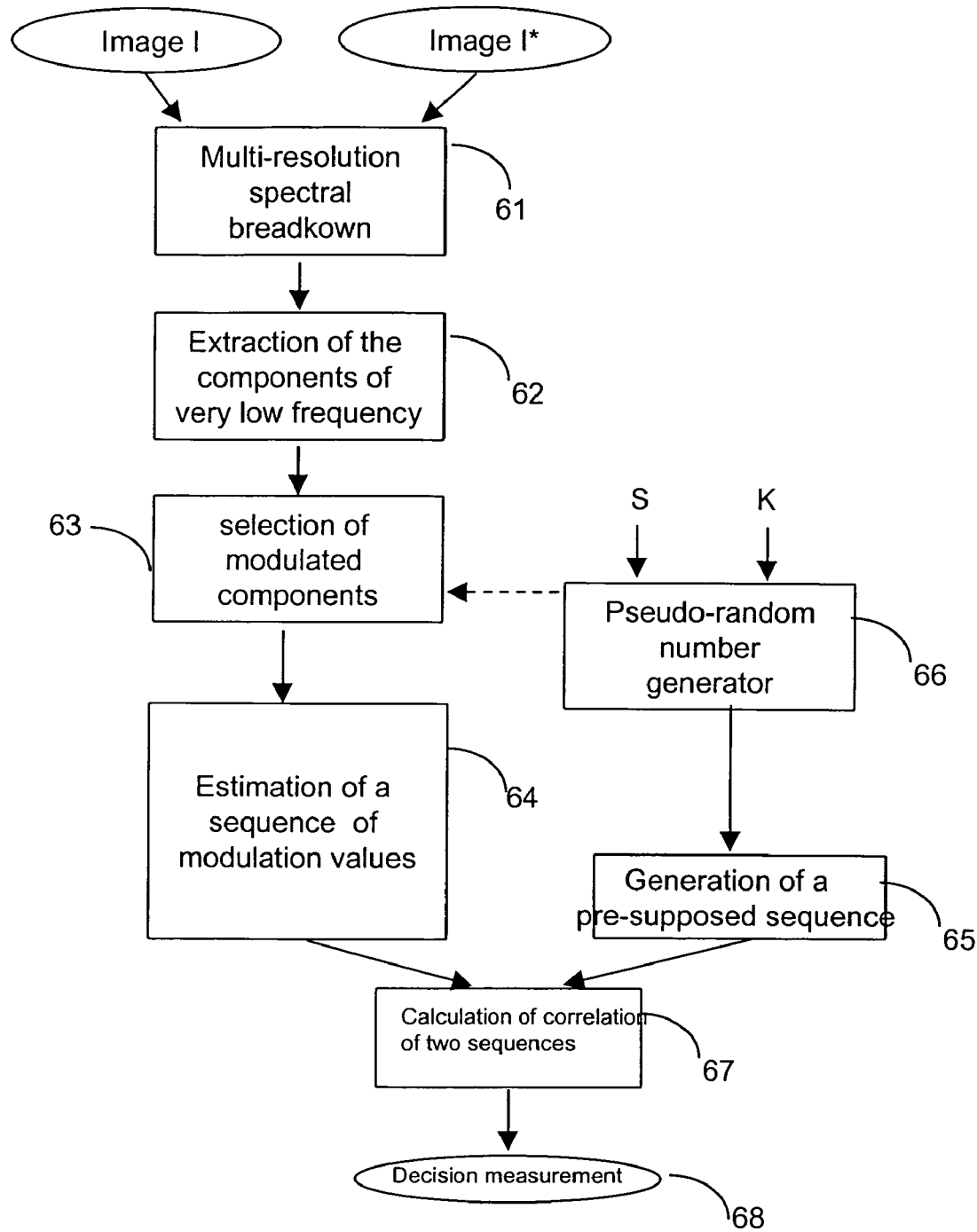
FIG. 9 is a block diagram illustrating a decoding device according to one embodiment of the first aspect of the invention.

As illustrated in FIG. 9, the decoding device according to the first aspect of the invention has:
  means 61 for the multi-resolution spectral breakdown of watermarked digital data I* and initial digital data I;
  means 62 of extracting the components of lowest frequency in the watermarked digital data I* and initial digital data I;
  means 63 of selecting the subset of components chosen at the choosing step E3 of the insertion method previously described from the watermarked digital data I* and initial digital data I;
  means 64 of estimating, by subtraction respectively of the components $I'_{ij}*$ of said subset of watermarked digital data I* from the components $I_{ij}$ of said subset of initial digital data I, an estimated sequence W* of modulation values $w_k*$,
  means 65 of generating a presupposed sequence W of modulation values $w_k$ inserted at the modulation step E4 of said insertion method;
  means of calculating a correlation value between the estimated sequence W* and the presupposed sequence W; and
  means 68 of deciding on the similarity or not of the estimated sequence W* and the presupposed sequence W according to said correlation value.

In a similar manner to the insertion device, the spectral breakdown means 61 can be adapted to perform a discrete wavelet transformation, the extraction means 62 being adapted to choose the components of the approximation sub-band LL. This spectral breakdown was described in detail above.

In a second embodiment of the invention, the spectral breakdown means 61 are adapted to break down the initial digital data I and watermarked digital data I* iteratively into an approximation version corresponding to a low-pass filtering and a sub-sampling of the digital data or a previous approximation version, and into a detail version corresponding to the subtraction of the approximation version from the digital data or from said previous approximation version, the extraction means 62 being adapted to choose the components of the approximation version.

It will easily be understood that the choice of these spectral breakdown means depends on the type of breakdown used during the insertion of the secret information S.

The means 65 of generating the presupposed sequence W of modulation values cooperate with a generator 66 generating modulation values generated by means of a pseudo-random function initialized by a digital signal S representing supplementary information to be decoded.

This generator 66 is identical to the generator 16 used in the insertion device and makes it possible to recalculate the modulation values wk using the same Gaussian law G initialized by a digital signal S representing supplementary information which it is wished to decode.

Likewise, the selection means 63 cooperate with a generator 66 of numbers $b_k$ in accordance with a pseudo-random function initialized by a digital signal K representing a confidential key associated with the supplementary information S to be decoded.

As illustrated in FIG. 4, the means of spectral breakdown 61, extraction 62, selection 63, estimation 64, generation 65, calculation 67 and decision 68 are incorporated in a microprocessor 10, a read-only memory 102 containing a program for decoding a supplementary information item S and a random access memory 103 containing registers adapted to record variables modified during the running of the program.

The microprocessor 10 and its functioning are identical to those described previously for the insertion device and method according to the first aspect of the invention.

The program for decoding a supplementary information item could be stored on a hard disk 108 of the computer 10 or be stored wholly or partly on a storage means which is removable and not integrated into the computer proper.

A central unit 100 (CPU) makes it possible to execute the instructions of the decoding program. Thus, on powering-up, the program stored in one of the non-volatile memories, for example the read-only memory 102, is stored in a random access memory (RAM) 103 which will also contain the variables necessary for implementing the decoding method according to the invention.

The random access memory 103 can contain notably several registers for storing the variables modified during the running of the program. Thus it has by way of example a register for storing the size of the approximation sub-band at each breakdown level, a register for storing the pseudo-random number drawn for determining the components to be modulated, a register for storing the component subset chosen, a register for storing the estimated sequence of modulation values, a register for storing the presupposed sequence of modulation values and a register for storing the calculation of the correlation value.

The supply of the data in which it is wished to decode a secret watermark, for example to identify their author, to the computer 10 can be performed by different peripherals and notably a digital camera 107 connected to a graphics card, or a scanner, an X-ray radiography apparatus or any other means of acquiring or storing images.

The communication network 113 can also be adapted to supply a digital image to be decoded. The diskette 110 can likewise contain digital data.

This decoding device can also be incorporated in any type of digital processing apparatus, directly in a digital photographic apparatus or a digital camera, or be integrated into a database management system in order to decode the digital data stored or processed.

A description will now be given, in a more detailed fashion, of the decoding method according to the invention for decoding a supplementary information item S inserted in digital data I according to the insertion method according to the first aspect of the invention.

Figure 10:
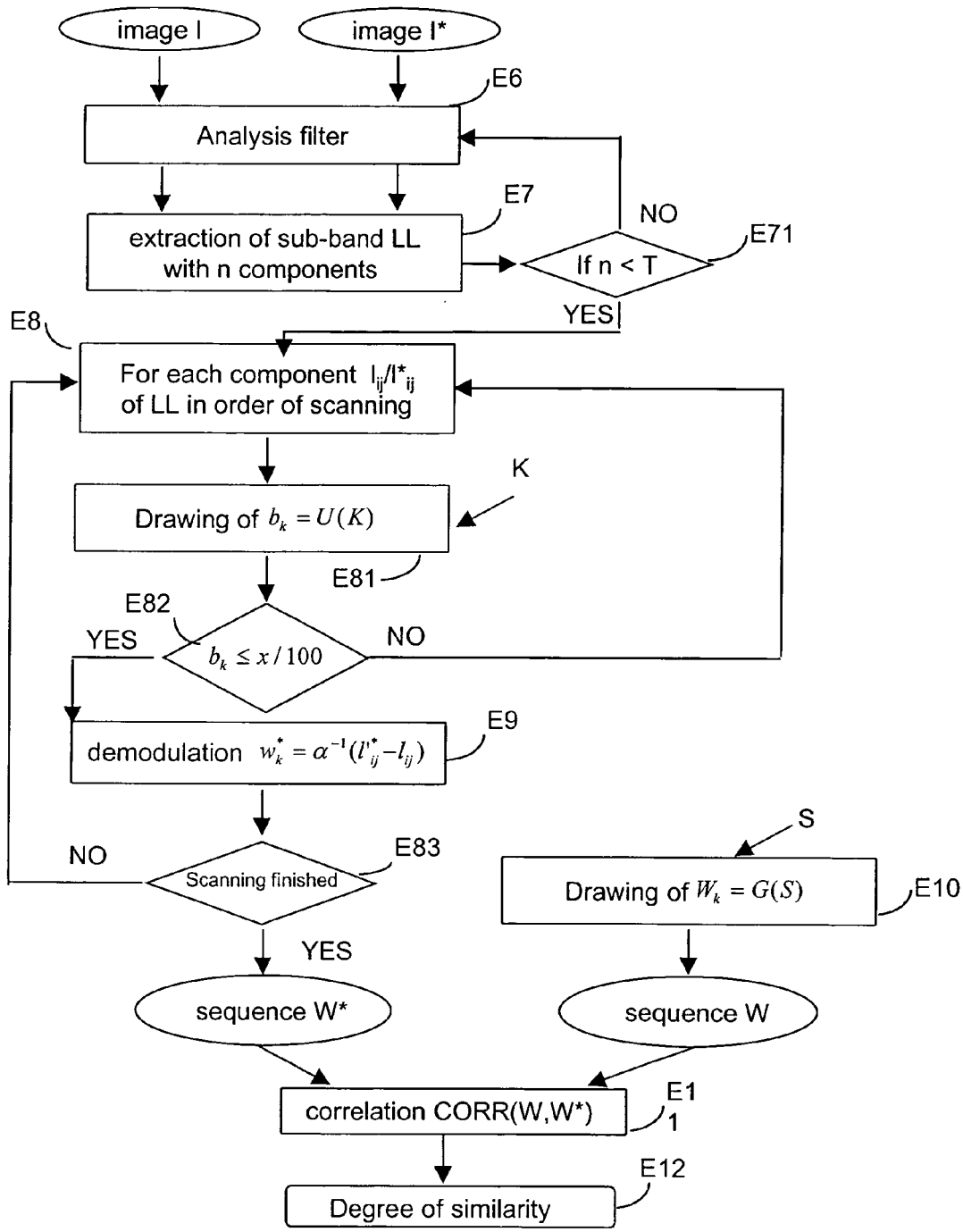
FIG. 10 is an algorithm for decoding a supplementary information item in an image according to a first embodiment of the first aspect of the invention.
Figure 11:
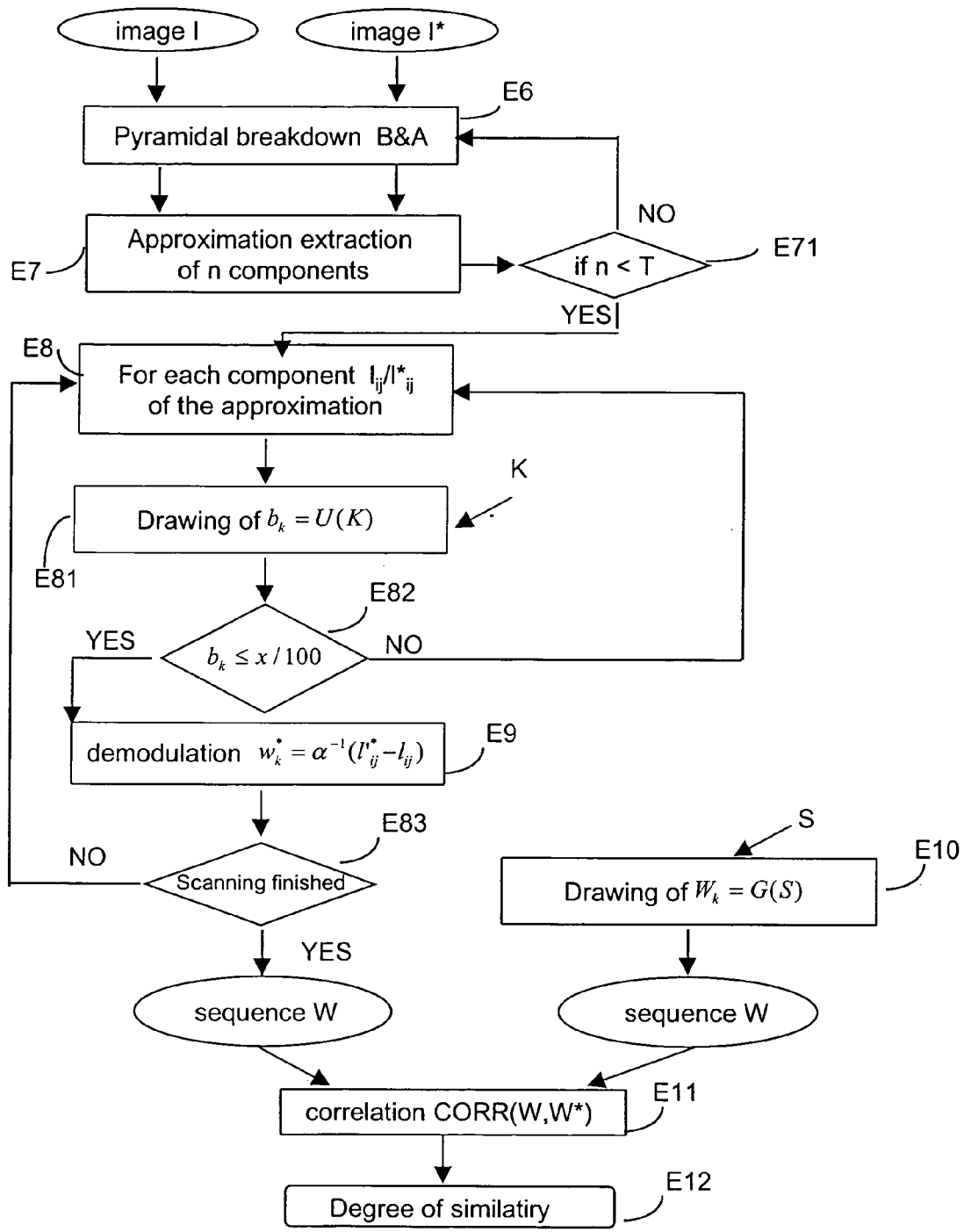
FIG. 11 is an algorithm for decoding a supplementary information item in an image according to a second embodiment of the first aspect of the invention.

This decoding method includes, with reference to FIGS. 10 and 11, the following steps:

multi-resolution spectral breakdown E6 of the watermarked digital data I* and of the initial digital data I;

extraction E7 of the components of lowest frequency from the watermarked digital data I* and initial digital data I;

selection E8 of the subset of components chosen at the choosing step E3 of said insertion method in the watermarked digital data I* and initial digital data I;

estimating E9, by subtraction respectively of the components of said subset of watermarked digital data I* from components of said subset of initial digital data I, an estimated sequence W* of modulation values;

generation E10 of a presupposed sequence W of modulation values inserted at the modulation step E4 of said insertion method;

calculation E11 of a correlation value between the estimated sequence W* and the presupposed sequence W; and decision E12 on the similarity or not of the estimated sequence W* and the presupposed sequence W according to said correlation value.

FIGS. 10 and 11 illustrate decoding methods which are identical apart from their breakdown E6 and extraction E7 steps.

In a first embodiment illustrated in FIG. 10, the spectral breakdown is performed by a discrete wavelet transformation, and, at the extraction step E7, the components of the approximation sub-band LL are chosen.

Such a decoding method is used when the supplementary information S has been inserted using an insertion method according to the first embodiment of the invention described with reference to FIG. 7.

In a second embodiment of the decoding method, illustrated in FIG. 11, during the spectral breakdown E6, the initial digital data I and watermarked digital data I* are broken down iteratively into an approximation version corresponding to a low-pass filtering and a sub-sampling of the digital data or a previous approximation version, and into a detail version corresponding to the subtraction of the approximation version from the digital data or from said previous approximation version, and, at the extraction step E7, the components of the approximation version are chosen.

Such a decoding method is used when the supplementary information S has been inserted using an insertion method according to a second embodiment of the insertion method as described with reference to FIG. 8.

In both cases, the multi-resolution spectral breakdown methods are identical to those used in the associated insertion method.

At each breakdown level, it is checked, in a test step E71, whether the size of the approximation sub-band is less than a threshold value T and, in the negative, the spectral breakdown is reiterated at a higher breakdown level. The threshold value used T is identical to that used in the insertion method described above.

At the selection step E8, the subset of components is chosen according to a pseudo-random function initialized by a digital signal K representing a confidential key associated with the supplementary information S to be decoded.

A uniform law U is used, identical to that used during the insertion method and initialized by the confidential key K in order to find the same series of pseudo-random real numbers. It is thus possible to find all the components $I'_{ij}*$ modulated in the noisy image I* and the initial components $I_{ij}$ which have been modulated.

For each component $I_{ij}$ and $I_{ij}*$ taken in a predetermined scanning order of the approximation sub-bands LL of the initial digital data I and watermarked digital data I*, there is effected, in a step E81, a drawing of $b_k = U(K)$. At a step E82, this number $b_k$ is compared with a coverage ratio x/100, here equal to 0.8.

If $b_k$ is greater than 0.8, the following component in the predefined scanning order is passed to directly.

Otherwise, at step E9, the difference between the components $I_{ij}$ and $I'_{ij}*$ is produced in order to obtain an estimation $w_k*$ of the inserted modulation values $w_k$ for each modulated component:

$$w_{k^*} = \frac{1}{\alpha}(I'_{ij^*} - I_{ij})$$

It is tested, in a step E83, whether the scanning of the sub-bands LL is terminated. In the negative, steps E8 et seq are reiterated for the following components in the scanning order.

In this way a sequence W* is obtained, corresponding to the series of estimated values $w_k*$.

The decoder also has information S and can calculate, in a generation step E10, the presupposed sequence W of the modulation values $w_k$, that is to say all the $w_k$ values according to the Gaussian law G(S) used during the modulation step E4 of the insertion method.

There is then effected, in a calculation step E11, a measurement of correlation between W and W*, for example using a standardized correlation measurement:

$$corr(W, W^*) = \frac{(W, W^*)}{\|W\| \times \|W^*\|}$$

where $(W,W^*) = \Sigma_k w_k w_k^*$ and $\|W\| = \sqrt{(W,W)}$.

The calculation of a degree of similarity by 100×corr (W, W*) makes it possible to decide, in a decision step E12, on the similarity or not of the two sequences W and W*.

Above 50%, the correlation is considered to be sufficient to give a positive response at the output of the detector 3. Naturally, the closer the correlation is to 100%, the more reliable is the detection and therefore the recognition of an inserted information item S.

It should be noted here that the insertion method according to the first aspect of the invention gives, at the time of decoding, a degree of similarity greater than 75% for various compression algorithms such as JPEG (Joint Photographic Expert Group) as far as a quality factor of 5, which corresponds to a greatly degraded image.

Figure 12:
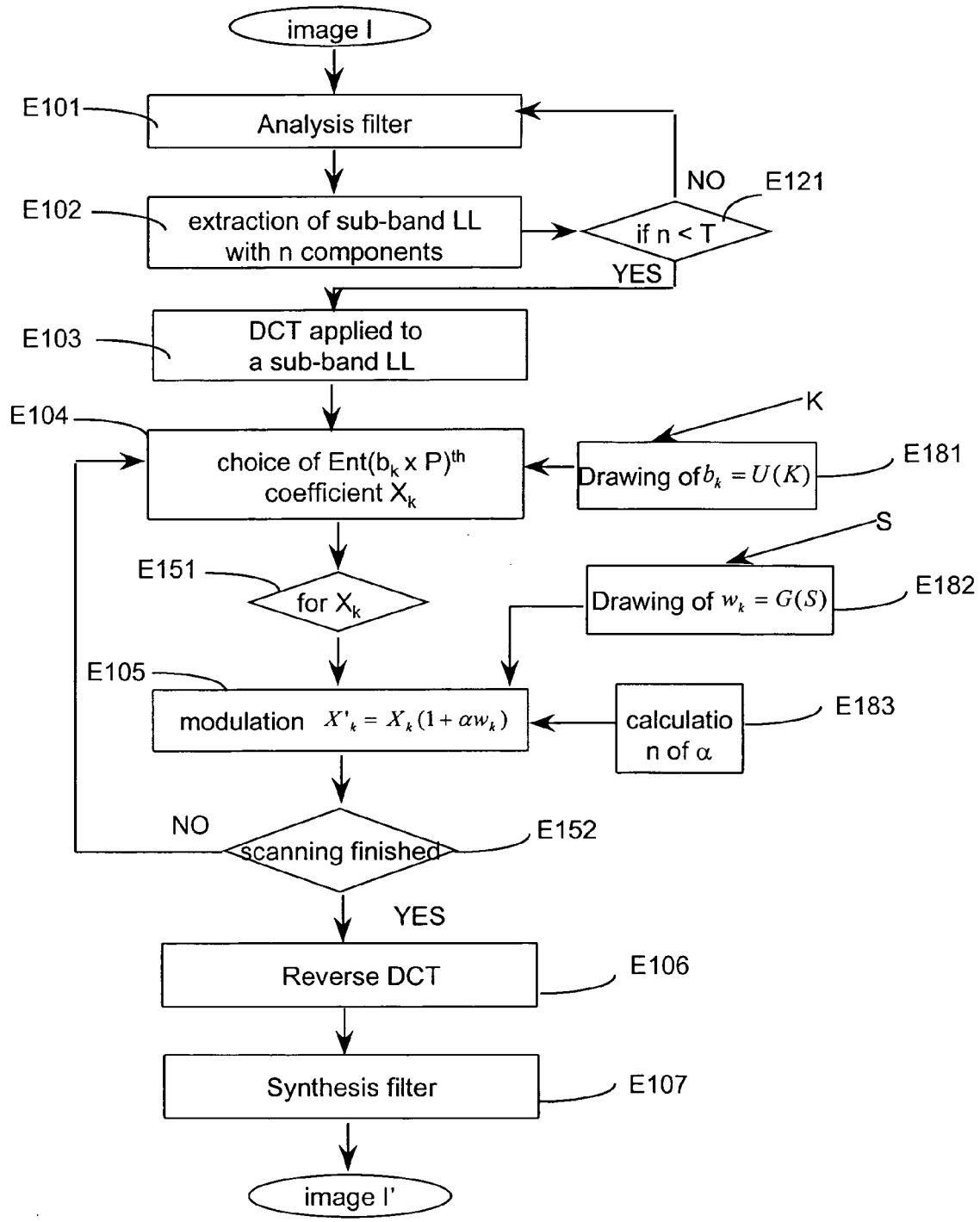
FIG. 12 is an algorithm for inserting a supplementary information item in an image according to one embodiment of the second aspect of the invention.

The insertion method according to the second aspect of the invention will now be described with reference notably to FIG. 12.

According to the invention, the method of inserting a supplementary information item S, such as a secret watermark, in digital data, here an image I, includes the following steps:
a) multi-resolution spectral breakdown E101 of the digital data I;
b) extraction E102 of the components of a frequency sub-band.

The insertion method is here applied, by way of example, to an image I of size N×N with N=512 bytes.

The spectral breakdown E101 is effected for example by means of a discrete wavelet transformation. The number d of levels of breakdown by wavelet transformation is predetermined so that the number n of components of the approximation sub-band LL is between 8×8 and 32×32 components.

In this way a threshold value T is fixed, for example 32×32, and, at each breakdown level, the number n of components of the approximation sub-band LL is compared with this threshold value T during a test step E121.

If the test is negative, that is to say n is greater than the threshold value T, the sub-band is broken down at a higher breakdown level.

In this example, where the image I is square and with a size equal to 512×512 bytes, a breakdown into sub-bands with decimators by two is used. The size of the sub-band LL, also square, is, at each breakdown level d, equal to $N/2^d \times N/2^d$.

By fixing a threshold value T at 32×32 bytes, a sub-band LL of suitable size for a breakdown level d equal to 4 is obtained.

At step E102, the approximation sub-band $LL_4$ of low frequency is consequently chosen.

According to the method of the second aspect of the invention, a spectral transformation of the components of the frequency sub-band $LL_4$ is implemented at a step E103. This spectral transformation is here a discrete cosine transform or DCT.

This DCT transformation is effected on a matrix $LL_4$ which is much smaller than the original image I, here one sixteenth of the size of the image I. The transformation is therefore much more rapid.

It could also be replaced by a fast Fourier transform or FFT.

At step E104, in accordance with the invention the choice is made of a subset of coefficients $X_k$ of the DCT spectral transformation limited to the sub-band $LL_4$. The coefficients $X_k$ to be modulated are thus chosen from a restricted set of spectral coefficients.

A number P of coefficients to be modulated is determined: for example, P is equal to $(N/2^d \times N/2^d)/2$ coefficients.

The continuous component (DC coefficient) is excluded from the set of coefficients to be modulated.

In this example, the subset of coefficients is chosen according to a pseudo-random function initialized by a digital signal K representing a confidential key associated with the supplementary information S to be inserted.

Use is for example made of a uniform law U(0,1) which, at a given initialization value K, associates a series of pseudo-random numbers uniformly distributed over the interval]0,1]. In practice, the value 1 is also excluded.

A drawing is carried out at step E181 according to this predetermined uniform U law initialized by K, so that $b_k = U(K)$ is obtained for k between 1 and P, with $b_k$ strictly between 0 and 1.

At each drawing E181, the integer part of $b_k \times P$ is calculated, which gives an integer number $n_k = \text{Ent}(b_k P)$ between 0 and P−1. It is then chosen to modulate the $n_k^{th}$ coefficient amongst the modulatable coefficients of the DCT which are read for example in a zigzag scanning order, from the top left hand corner to the bottom right hand corner of the transformed sub-band $LL_4$. In this way a subset of coefficients $X_k$ is obtained, with k varying from 1 to P.

Naturally, without a confidential key K, it is possible to choose the P largest coefficients in magnitude or the P first coefficients in the zigzag running order, always excluding the DC coefficient.

Still according to the invention, the coefficients $X_k$ of the chosen subset are modulated at step E105 by adding a modulation value generated by a pseudo-random function in a step E182 initialized by the digital signal S representing the supplementary information to be inserted.

By way of example use is made of a Gaussian law G(0,1) initialized by the signal to be inserted S.

At step E182 a drawing is effected of a modulation value $w_k = G(S)$ for each coefficient $X_k$, with k varying between 1 and P.

A correction coefficient $\alpha$ is calculated at step E183. This coefficient $\alpha$ can be constant for all the coefficients $X_k$ to be modulated and can typically be equal to 0.1. It ensures invisibility of the inserted information S.

Modulation of the coefficient $X_k$ is of obtained by adding at step E105 the modulation value:

$$X'_k = X_k(1 + \alpha w_k)$$

A test is carried out at step E152 in order to verify whether all the coefficients $X_k$ of the chosen subset have been modulated.

If not, the following coefficient $X_{k+1}$ is considered and the process is repeated as from step E182 by drawing a new modulation value $w_{k+1}$.

When the scanning is ended, a reverse spectral transformation is carried out at step E106, here a reverse DCT, of the coefficients of the sub-band $LL_4$ including the subset of modulated coefficients $X'_k$.

Then a last reverse multi-resolution spectral recomposition step E107, by using synthesis filters when it is a case as here of a reverse wavelet transformation, gives the watermarked image I'.

By virtue of the insertion method according to the second aspect of the invention, the watermark S inserted in the image I' is much more robust to subsequent processing of the image I'. It is distributed throughout the entire spatial domain of the image I', but the inserted modulation is limited to a frequency band.

The decoding of an inserted watermark in this second aspect of the invention will now be described with reference particularly to FIGS. 13 and 14.

The decoder 2 (see FIG. 1) receives a noisy image I* and it also has available the original image I as well as information S associated with the confidential key K.

Figure 13:
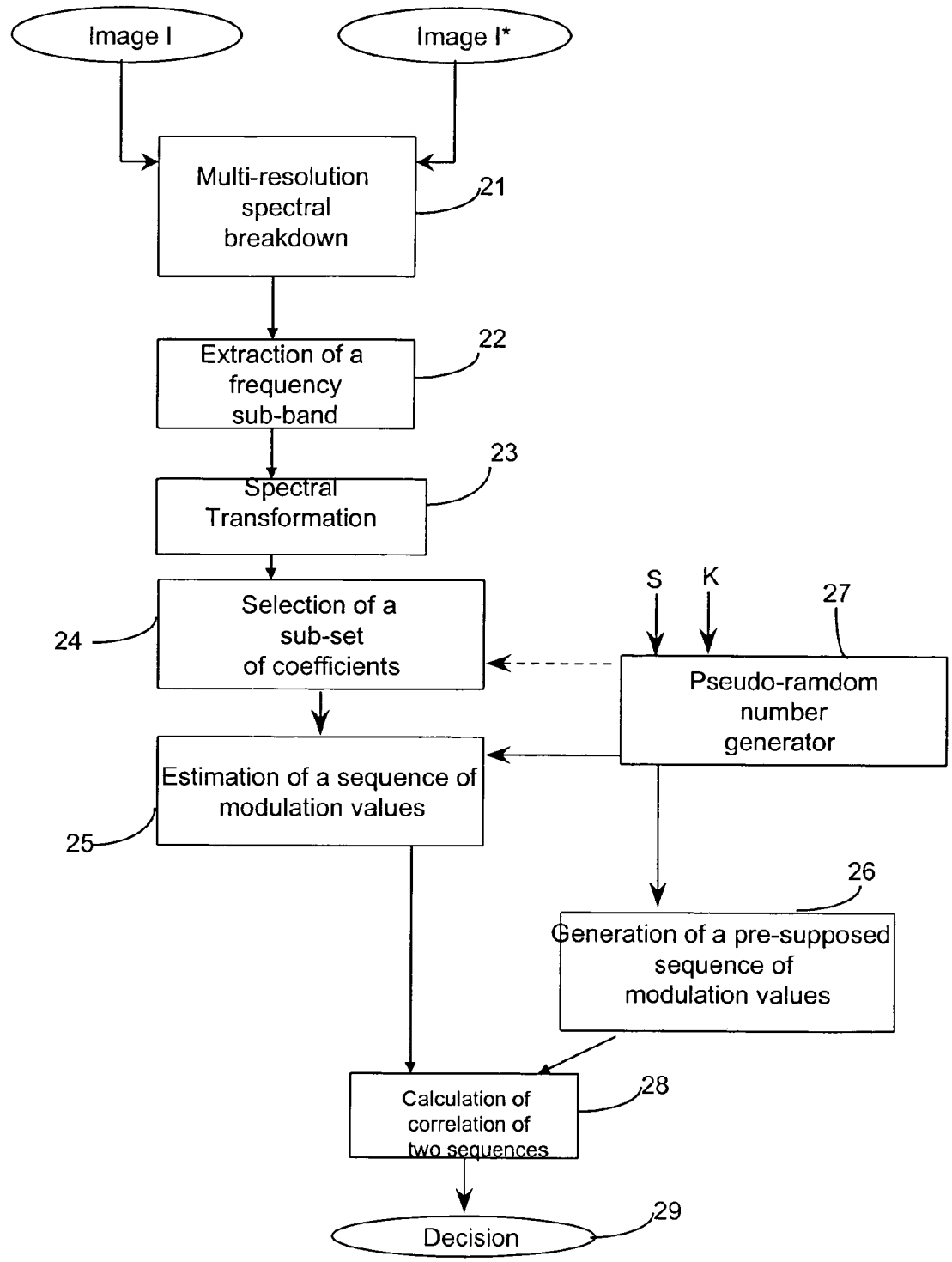
FIG. 13 is a block diagram illustrating a decoding device according to one embodiment of the second aspect of the invention.

As illustrated in FIG. 13, the decoding device according to the second aspect of the invention has:

means 21 for the multi-resolution spectral breakdown of watermarked digital data I* and initial digital data I;

means 22 of extracting the components of a frequency sub-band LL respectively in the watermarked digital data I* and initial digital data I;

means 23 for the spectral transformation of the components of the frequency sub-band LL of the watermarked digital data I* and initial digital data I;

means 24 of selecting the subset of components chosen at the choosing step E104 of said insertion method from the watermarked digital data I* and initial digital data I;

means 25 of estimating, by subtraction respectively of the coefficients of said subset of watermarked digital data I* from the coefficients of said subset of initial digital data I, an estimated sequence W* of modulation values, means 26 of generating a presupposed sequence W of modulation values inserted at the modulation step E105 of said insertion method;

means 28 of calculating a value of correlation between the estimated sequence W* and the presupposed sequence W; and means 29 of deciding on the similarity or not of the estimated sequence W* and the presupposed sequence W according to said correlation value.

In a similar manner to the insertion device, the extraction means 22 are adapted to choose the components of the sub-band with the lowest frequency LL.

In this example, the multi-resolution spectral breakdown means 21 are adapted to effect a discrete wavelet transformation, the extraction means 22 being adapted to choose the components of the approximation sub-band LL. This spectral breakdown was described in detail above and is implemented by the decoding device in the same way as the insertion device described previously in reference to FIG. 3.

Naturally, if a spectral breakdown of the pyramidal type is implemented by the insertion device, the associated decoding device will also use the same type of pyramidal breakdown for decoding the supplementary information inserted.

Likewise, the spectral transformation means 23 are adapted to produce a discrete cosine transform.

It will easily be understood that, in general terms, the means of spectral breakdown 21, extraction 22 and spectral transformation 23 are identical to the means of spectral breakdown 31, extraction 32 and spectral transformation 33 used in the insertion device for inserting the supplementary information S which it is wished to decode.

The means 26 of generating the presupposed sequence W of modulation values cooperate with a generator 27 generating modulation values generated by means of a pseudo-random function initialized by a digital signal S representing supplementary information to be decoded.

This generator 27 is identical to the generator used in the insertion device and makes it possible to recalculate the modulation values wk using the same pseudo-random function.

Likewise, the selection means 24 cooperate with a generator 27 of numbers $b_k$ in accordance with a pseudo-random function initialized by a digital signal K representing a confidential key associated with the supplementary information S to be decoded.

The means of spectral breakdown 21, extraction 22, spectral transformation 23, selection 24, estimation 25, generation 26, calculation 28 and decision 29 can be incorporated in a microprocessor 10 as illustrated in FIG. 4. This microprocessor 10 is identical in its structure to that described previously for the incorporation of the insertion device according to the second aspect of the invention.

A read-only memory 102 contains a program for decoding a supplementary information item S and a random access memory 103 contains registers adapted to record variables modified during the running of the program.

The program for decoding a supplementary information item could be stored on a hard disk 108 of the computer 10 or be stored wholly or partly on a storage means which is removable and not integrated into the computer proper.

A central unit 100 (CPU) makes it possible to execute the instructions of the decoding program.

The random access memory 103 can contain notably several registers for storing the variables modified during the running of the program. Thus it has by way of example a register for storing the size of the approximation sub-band at each breakdown level, a register for storing the coefficients of the DCT transformation in a predetermined scanning order, a register for storing the pseudo-random number drawn for determining the components to be modulated, a register for storing the component subset chosen, a register for storing the estimated sequence of modulation values, a register for storing the presupposed sequence of modulation values and a register for storing the calculation of the correlation value.

The supply of the data in which it is wished to decode a secret watermark, for example to identify their author, to the computer 10 can be performed by different peripherals and notably a digital camera 107 connected to a graphics card, or a scanner, an X-ray radiography apparatus or any other means of acquiring or storing images.

This decoding device can also be incorporated in any type of digital processing apparatus, directly in a digital photographic apparatus or a digital camera, or be integrated into a database management system in order to decode the digital data stored or processed.

A description will now be given, in a more detailed fashion, of the decoding method according to the invention for decoding a supplementary information item S inserted in digital data I according to the insertion method according to the second aspect of the invention.

Figure 14:
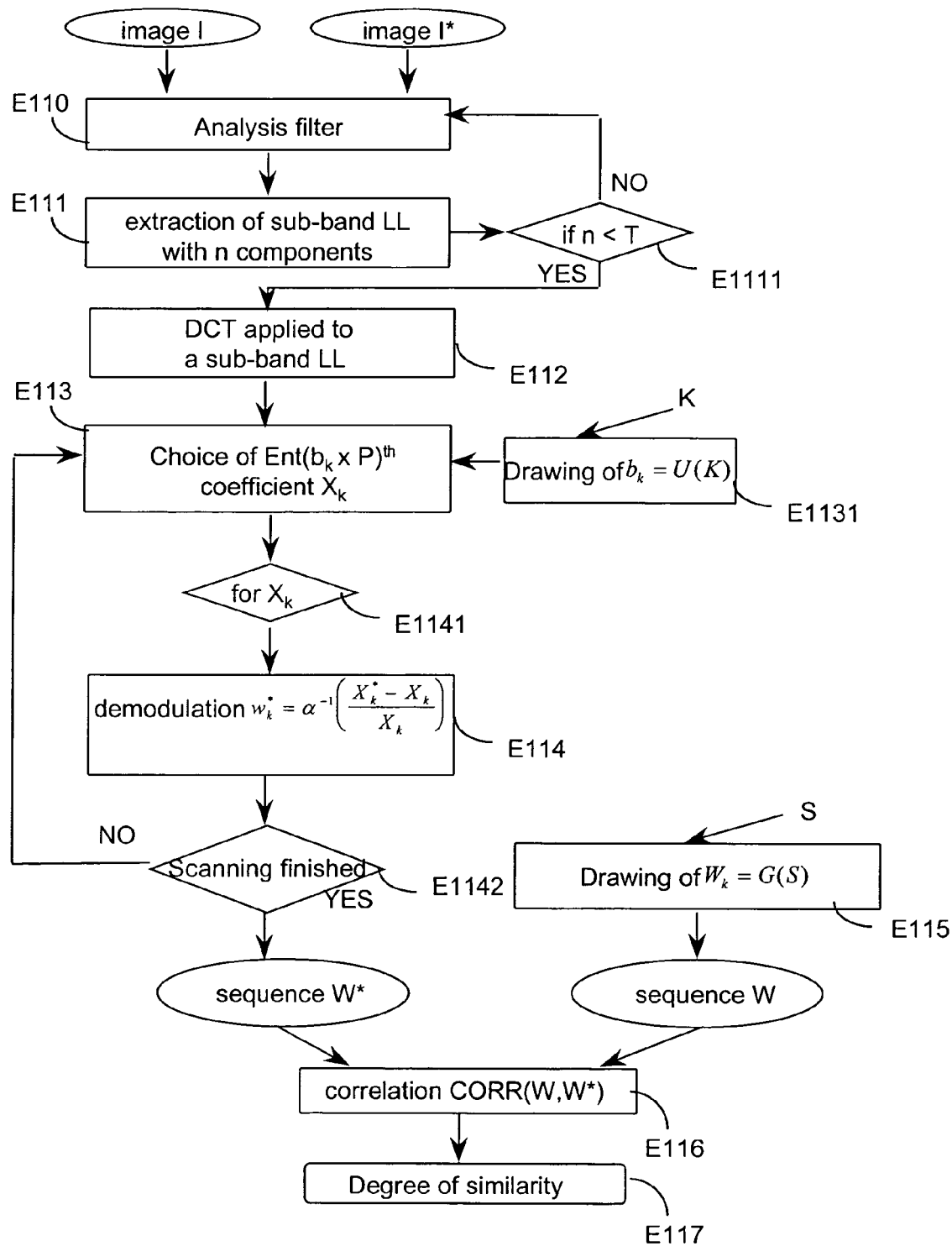
FIG. 14 is an algorithm for decoding a supplementary information item in an image according to one embodiment of the second aspect of the invention.

This decoding method includes, with reference to FIG. 14, the following steps:

multi-resolution spectral breakdown E110 of the watermarked digital data I* and of the initial digital data I;

extraction E111 of the components of a frequency sub-band LL respectively in the watermarked digital data I* and initial digital data I;

spectral transformation E112 of the components of the frequency sub-band LL of the watermarked digital data I* and initial digital data I;

selection E113 of the subset of coefficients chosen at the choosing step E104 of said insertion method from the watermarked digital data I* and initial digital data I;

estimating E114, by subtraction respectively of the coefficients of said subset of watermarked digital data I* from coefficients of said subset of initial digital data I, an estimated sequence W* of modulation values;

generation E115 of a presupposed sequence W of modulation values inserted at the modulation step E105 of said insertion method;

calculation E116 of a value of correlation between the estimated sequence W* and the presupposed sequence W; and decision E117 on the similarity or not of the estimated sequence W* and the presupposed sequence W according to said correlation value.

As in the associated insertion method, at the spectral breakdown step E110, the spectral breakdown is effected by means of a discrete wavelet transformation and, at the extraction step E111, the components of the approximation sub-band LL with the lowest frequency are chosen.

At each breakdown level, it is checked, in a test step E111, whether the size of the approximation sub-band is less than a threshold value T and, in the negative, the spectral breakdown is reiterated at a higher breakdown level. The threshold value used T is identical to that used in the insertion method described above in reference to FIG. 12.

The spectral transformation is also a discrete cosine transform DCT.

At the selection step E113, the subset of coefficients is chosen according to a pseudo-random function initialized by a digital signal K representing a confidential key associated with the supplementary information S to be decoded.

A uniform law U is used, identical to that used during the insertion method and initialized by the confidential key K in order to find the same series of pseudo-random real numbers. It is thus possible to find all the coefficients $X'_k{}^*$ modulated in the noisy image I* and the initial components $X_k$ which have been modulated in the initial image I.

More precisely, and as described in detail in the insertion method, a drawing is effected, at step E1131, of a number $b_k=U(K)$, and the integer part of $b_k \times P$ is calculated, with P equal to the number of coefficients modulated. $n_k=$ Ent $(b_k \times P)$ is obtained, and the $n_k{}^{th}$ coefficient is selected in the predefined order of scanning of the coefficients of the DCT both for the noisy image I* and for the initial image I.

For the subset of selected coefficients, at the estimation step E114, the difference is produced between these coefficients $X'_k{}^*$ and $X_k$ in order to obtain an estimation $w_k{}^*$ of the modulation values $w_k$, with k varying from 1 to P, according to the following demodulation formula:

$$w_{k^*} = \frac{1}{\alpha}\left(\frac{X'_{k^*} - X_k}{X_k}\right)$$

Where the image I' has undergone significant distortions and if the modulated coefficient $X_k$ is of low amplitude, the estimated value $w_k{}^*$ can be very large, and therefore aberrant. In practice, it is necessary to restrict this value $w_k{}^*$: for example, if $w_k{}^*$ is greater than a threshold fixed at 5, then the value 1 is allocated to $w_k{}^*$.

In this way a sequence W* is obtained, corresponding to the series of estimated values $w_k{}^*$, for k varying between 1 and P.

At the generation step E115, the presupposed sequence W of modulation values is generated by a pseudo-random function initialized by a digital signal S representing the supplementary information to be decoded.

The decoder, also having information S available, can in fact calculate, in the generation step E115, the presupposed sequence W, that is to say all the wk values, for k varying from 1 to P according to the Gaussian law G(S) used during the modulation step E105 of the insertion method.

There is then effected, in a calculation step E116, a measurement of correlation between W and W*, for example using a standardized correlation measurement:

$$corr(W, W^*) = \frac{(W, W^*)}{\|W\| \times \|W^*\|}$$

where $(W,W^*)=\Sigma_k w_k w_k{}^*$ and $\|W\|=\sqrt{(W,W)}$.

The calculation of a degree of similarity by $100 \times corr(W, W^*)$ makes it possible to decide, in a decision step E117, on the similarity or not of the two sequences W and W*.

Above 50%, the correlation is considered to be sufficient to give a positive response at the output of the detector 3.

Naturally, the closer the correlation is to 100%, the more reliable is the detection and therefore the recognition of an inserted information item S.

Figure 15:
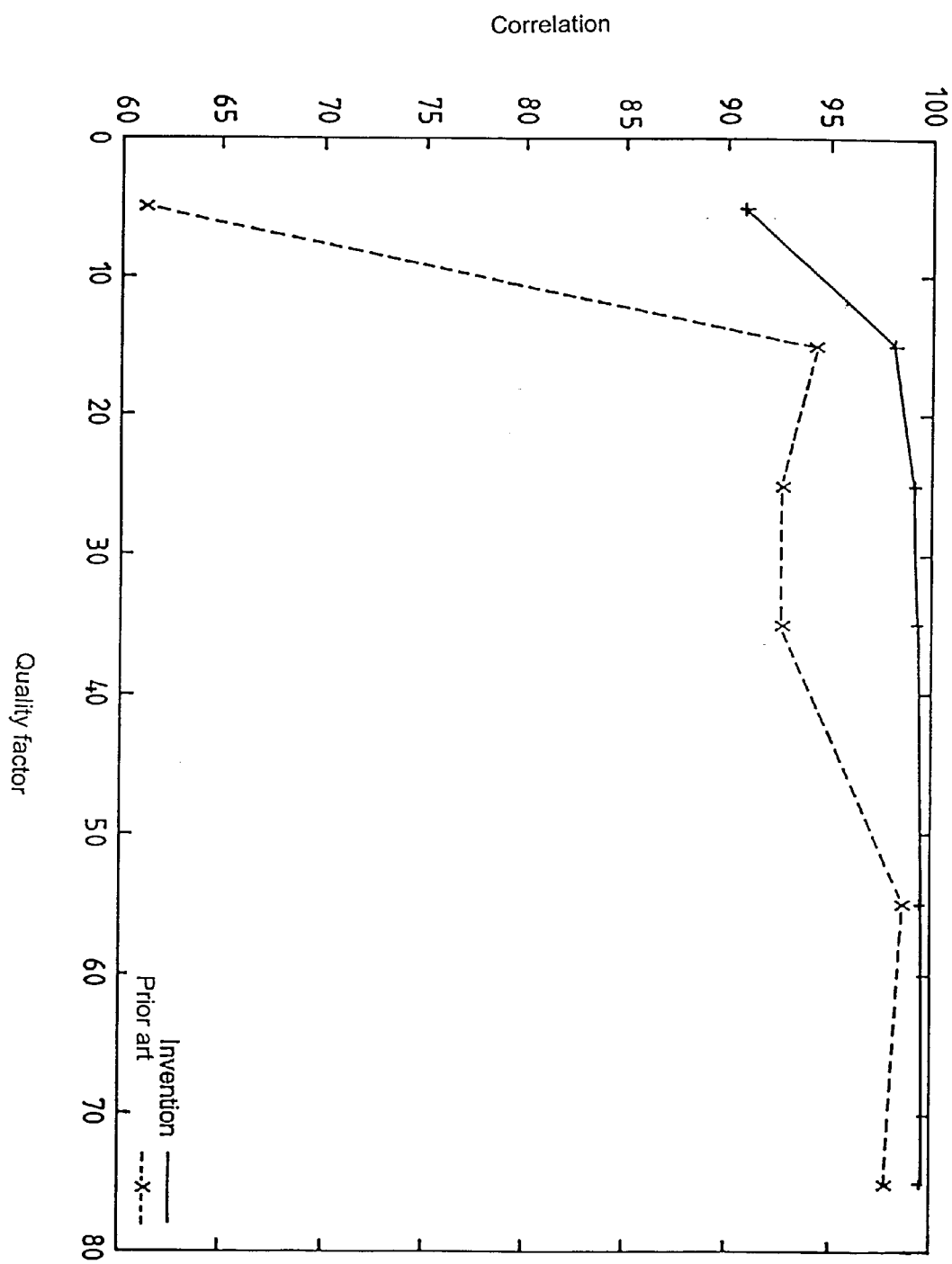
FIG. 15 is a comparative curve of the robustness to compression according to the JPEG standard of a watermark inserted by an insertion method according to the second aspect of the invention and by a method of the prior art.

FIG. 15 compares the robustness of the information inserted according to the insertion method according to the second aspect of the invention and a prior method in which the supplementary information is inserted using a DCT transformation applied to the entire image I.

This robustness is represented by the degree of similarity between the watermark inserted and the watermark extracted after processing of the image I', according to the quality factor of the processing used.

In this example, the image I' has undergone a compression and decompression processing according to the JPEG (Joint Photographic Expert Group) standard based on a discrete cosine transformation DCT.

In the method according to the invention, the breakdown level is equal to 5 and, in both cases, the number of modulated coefficients is equal to 128.

It is found here that the method according to the invention gives a degree of similarity of 90% up to a quality factor of 5, which corresponds to a highly degraded image, whereas the method of the prior art is appreciably below as far as a quality factor of 60.

The insertion methods according to the invention and the associated devices thus make it possible to greatly increase the robustness of information inserted in digital data in an imperceptible fashion.

Naturally, the invention is not limited to the examples described above, and many modifications can be made to it without departing from the scope of the invention.

Thus the watermarked digital data could also be audio data.

In addition, the spectral transformation could be applied to a detail sub-band rather than to the approximation sub-band of the multi-resolution spectral breakdown in the second aspect of the invention.

What is claimed is:

1. A method of inserting a supplementary information item (S), in a digital image (I), characterized in that it includes the following steps:
   multi-resolution spectral breakdown (E1) of the digital image at a number (d) of breakdown levels dependent on image size and determined so that a lowest frequency sub-band has a number (n) of components of lowest frequency comprised between 8×8 and 32×32;
   extraction (E2) of the components of the lowest frequency sub-band;
   choice (E3) of a subset of the components consisting of only components in the lowest frequency sub-band;
   modulation (E4) of only the components of the subset consisting of only components in the lowest frequency sub-band in order to insert the supplementary information item (S); and
   reverse multi-resolution spectral recomposition (E5) of the watermarked digital image (I').

2. Insertion method according to claim 1, characterized in that, at the spectral breakdown step (E1), the spectral breakdown is performed by a discrete wavelet transformation and, at the extraction step (E2), the components of the approximation sub-band (LL) are chosen.

3. Insertion method according to claim 1, characterized in that, at the spectral breakdown step (E1), the digital data (I) are broken down iteratively into an approximation version corresponding to a low-pass filtering and a sub-sampling of the digital data or of a previous approximation version, and into a detail version corresponding to the subtraction of the approximation version from the digital data or from said previous approximation version, and, at the extraction step (E2), the components of the approximation version are chosen.

4. Insertion method according to claim 1, characterized in that, at the modulation step (E4), the components of said subset are modulated by adding a modulation value ($w_k$) generated by a pseudo-random function initialized by a digital signal (S) representing the supplementary information to be inserted.

5. Insertion method according to claim 1, characterized in that, at the choosing step (E3), the subset of components is chosen according to a pseudo-random function initialized by a digital signal (K) representing a confidential key associated with the supplementary information (S) to be inserted.

6. Insertion method according to claim 1, further comprising a step of transformation using a Discrete Cosine Transform of the components of lowest frequency.

7. A device for inserting a supplementary information item (S), in a digital image (I), characterized in that it has:
   means (11) for the multi-resolution spectral breakdown of the digital image (I) at a number (d) of breakdown levels dependent on image size and determined so that a lowest frequency sub-band has a number (n) of components of lowest frequency comprised between 8×8 and 32×32;
   extraction means (12) adapted to extract components of the lowest frequency sub-band;
   choosing means (13) for choosing a subset of the components consisting of only components in the lowest frequency sub-band;
   means (14) for modulating only the components of the subset consisting of only components in the lowest frequency sub-band in order to insert the supplementary information item (S); and
   means (15) for the reverse multi-resolution spectral recomposition of the watermarked digital image (I').

8. Insertion device according to claim 7, characterized in that the multi-resolution spectral breakdown means (11) are adapted to perform a discrete wavelet transformation, the extraction means (12) being adapted to choose the components of the approximation sub-band (LL).

9. Insertion device according to claim 7, characterized in that the multi-resolution spectral breakdown means (11) are adapted to break down the digital data (I) iteratively into an approximation version corresponding to a low-pass filtering and a sub-sampling of the digital data or of a previous approximation version, and into a detail version corresponding to the subtraction of the approximation version from the digital data or from said previous approximation version, the extraction means (12) being adapted to choose the components of the approximation version.

10. Insertion device according to claim 7, characterized in that the modulation means (14) cooperate with a generator (16) of modulation values ($w_k$) generated by a pseudo-random function initialized by a digital signal (S) representing the supplementary information to be inserted and having means (15) of adding the modulation values ($w_k$) to the components of said subset.

11. Insertion device according to claim 7, characterized in that the choosing means (13) for choosing a subset of components cooperate with a generator (16) generating numbers ($b_k$) according to a pseudo-random function initialized by a digital signal (K) representing a confidential key associated with the supplementary information (S) to be inserted.

12. Insertion device according to claim 7, characterized in that the means of spectral breakdown (11), extraction (12), choosing (13), modulation (14) and spectral recomposition (15) are incorporated in:
- a microprocessor (10);
- a read-only memory (102) containing a program for inserting a supplementary information item (S); and
- a random access memory (103) containing registers adapted to record variables modified during the running of the program.

13. Digital signal processing apparatus, characterized in that it has an insertion device according to claim 7.

14. Digital photographic apparatus, characterized in that it has an insertion device according to claim 7.

15. Digital camera, characterized in that it has an insertion device according to claim 7.

16. Database management system, characterized in that it has an insertion device according to claim 7.

17. Computer, characterized in that it has an insertion device according to claim 7.

18. Scanner, characterized in that it has an insertion device according to claim 7.

19. Medical imaging apparatus, and notably an X-ray radiography apparatus, characterized in that it has an insertion device according to claim 7.

20. Insertion device according to claim 7, further comprising means adapted to effect a Discrete Cosine Transform of the components of lowest frequency.

21. A method of decoding, in watermarked digital data (I*), a supplementary information item (S), inserted in initial digital data (I) according to the insertion method according to claim 1, characterized in that it includes the following steps:
- multi-resolution spectral breakdown (E6) of the watermarked digital data (I*) and initial digital data (I) at a level (d) dependent on image size and determined so that a lowest frequency sub-band has a number (n) of components of lowest frequency comprised between 8×8 and 32×32;
- extraction (E7) of the components of the lowest frequency sub-band in the watermarked (I*) and initial digital data (I);
- selection (E8) of the subset of components chosen at the choosing step (E3) of said method of insertion in the watermarked (I*) and initial digital data (I);
- estimating (E9), by subtraction respectively of the components of said subset of watermarked digital data (I*) from the components of said subset of initial digital data (I), an estimated sequence (W*) of modulation values;
- generation (E10) of a presupposed sequence (W) of modulation values inserted at the modulation step (E4) of said insertion method;
- calculation (E11) of a correlation value between the estimated sequence (W*) and the presupposed sequence (W); and
- decision (E12) on the similarity or otherwise of the estimated sequence (W*) and presupposed sequence (W) as a function of said correlation value.

22. Decoding method according to claim 21, characterized in that, at the spectral breakdown step (E6), the spectral breakdown is effected by a discrete wavelet transformation and, at the extraction step (E7), the components of the approximation sub-band (LL) are chosen.

23. Decoding method according to claim 21, characterized in that, at the spectral breakdown step (E6), the initial digital data (I) and watermarked digital data (I*) are broken down iteratively into an approximation version corresponding to a low-pass filtering and a sub-sampling of the digital data or of a previous approximation version, and into a detail version corresponding to the subtraction of the approximation version from the digital data or from said previous approximation version, and in that, at the extraction step (E7), the components of the approximation version are chosen.

24. Decoding method according to one of claims 21 to 23, characterized in that, at the generation step (E10), the presupposed sequence (W) of modulation values is generated by a pseudo-random function initialized by a digital signal (S) representing the supplementary information to be decoded.

25. Decoding method according to one of claims 21 to 23, characterized in that, at the selection step (E8), the subset of components is chosen according to a pseudo-random function initialized by a digital signal (K) representing a confidential key associated with the supplementary information (S) to be decoded.

26. Decoding method according to claim 21, further comprising a step of transformation using a Discrete Cosine Transform of the components of lowest frequency in the watermark (I*) and initial digital data(I).

27. A device for decoding, in watermarked digital data (I*), a supplementary information item (S), inserted in initial digital data (I) according to an insertion method comprising the steps of
- multi-resolution spectral breakdown (E1) of the digital data at a level (d) dependent on image size and determined so that a lowest frequency sub-band has a number (n) of components of lowest frequency comprised between 8×8 and 32×32;
- extraction (E2) of the components of the lowest frequency sub-band;
- choice (E3) of a subset of the components consisting of only components in the lowest frequency sub-band;
- modulation (E4) of the components of subset in order to insert the supplementary information (S); and
- reverse multi-resolution spectral recomposition (E5) of the watermarked digital data, said device comprising:
- means (61) of multi-resolution spectral breakdown of the watermarked digital data (I*) and initial digital data (I) at a level (d) dependent on the image size and determined so that a lowest frequency sub-band has a number (n) of components of lowest frequency comprised between 8×8 and 32×32;
- means (62) of extraction of the components of the lowest frequency sub-band in the watermarked (I*) and initial digital data (I);
- means (63) of selection of the subset of components chosen at the choosing step (E3) of said method of insertion in the watermarked (I*) and initial digital data (I);
- means (64) of estimating, by subtraction respectively of the components of said subset of watermarked digital data (I*) from the components of said subset of initial digital data (I), an estimated sequence (W*) of modulation values;
- means (65) of generating a presupposed sequence (W) of modulation values inserted at the modulation step (E4) of said insertion method;
- means (67) of calculating a correlation value between the estimated sequence (W*) and the presupposed sequence (W); and means (68) of deciding on the similarity or otherwise of the estimated sequence (W*) and of the presupposed sequence (W) as a function of said correlation value.

28. Decoding device according to claim 27, characterized in that the spectral breakdown means (61) are adapted to perform a discrete wavelet transformation, the extraction means (62) being adapted to choose the components of the approximation sub-band (LL).

29. Decoding device according to claim 27, characterized in that the spectral breakdown means (61) are adapted to break down the initial digital data (I) and watermarked digital data (I*) iteratively into an approximation version corresponding to a low-pass filtering and a sub-sampling of the digital data or of a previous approximation version, and into a detail version corresponding to a subtraction of the approximation version from the digital data or from the said previous approximation version, the extraction means (62) being adapted to choose the components of the approximation version.

30. Decoding device according to one of claims 27 to 29, characterized in that the means (65) of generating the presupposed sequence (W) of modulation values cooperate with a generator (66) generating modulation values generated by a pseudo-random function initialized by a digital signal (S) representing supplementary information to be decoded.

31. Decoding device according to one of claims 27 to 29, characterized in that the selection means (63) cooperate with a generator (66) generating numbers ($b_k$) in accordance with a pseudo-random function initialized by a digital signal (K) representing a confidential key associated with the supplementary information (S) to be decoded.

32. Decoding device according to one of claims 27 to 29, characterized in that the means of spectral breakdown (61), extraction (62), selection (63), estimation (64), generation (65), calculation (67) and decision (68) are incorporated in:
   a microprocessor (10);
   a read-only memory (102) containing a program for decoding a supplementary information item (S); and
   a random access memory (103) containing registers adapted to record variables modified during the running of the program.

33. Digital signal processing apparatus, characterized in that it has a decoding device according to one of claims 27 to 29.

34. Digital photographic apparatus, characterized in that it has a decoding device according to one of claims 27 to 29.

35. Digital camera, characterized in that it has a decoding device according to one of claims 27 to 29.

36. Database management system, characterized in that it has a decoding device according to one of claims 27 to 29.

37. Computer, characterized in that it has a decoding device according to one of claims 27 to 29.

38. Scanner, characterized in that it has a decoding device according to one of claims 27 to 29.

39. Medical imaging apparatus, and notably an X-ray radiography apparatus, characterized in that it has a decoding device according to one of claims 27 to 29.

40. Decoding device according to claim 27, further comprising means adapted to effect a Discrete Cosine Transform of the components of lowest frequency in the watermark (I*) and initial digital data (I).

41. A method of inserting a supplementary information item (S) in a digital image (I), characterized in that it includes the following steps:
   multi-resolution spectral breakdown (E1) of the digital image, resulting in spectral components, at a number (d) of breakdown levels dependent on image size and determined so that the lowest frequency sub-band has a number (n) of spectral components of lowest frequency comprised between 8×8 and 32×32;
   extraction (E2) of the components of the lowest frequency sub-band;
   choice (E3) of a subset of the components consisting of only components in the lowest frequency sub-band;
   modulation (E4) of only the components of the subset consisting of only components in the lowest frequency sub-band in order to insert the supplementary information item (S);
   reinsertion (E33) of said modulated components into the lowest frequency sub-band; and
   reverse multi-resolution spectral recomposition of spectral components in order to obtain a watermarked digital image (I').

42. Device for inserting a supplementary information item (S) in a digital image (I), characterized in that it includes:
   means for multi-resolution spectral breakdown (E1) of the digital data, resulting in spectral components, at a number (d) of breakdown levels dependent on image size and determined so that the lowest frequency sub-band has a number (n) of spectral components of lowest frequency comprised between 8×8 and 32×32;
   means for extraction (E2) of the components of the lowest frequency sub-band;
   means for choosing (E3) a subset of the components consisting of only components in the lowest frequency sub-band;
   means for modulation (E4) of only the components of the subset consisting of only components in the lowest frequency sub-band in order to insert the supplementary information item (S);
   means for reinsertion (E33) of said modulated components into the lowest frequency sub-band; and
   means for reverse multi-resolution spectral recomposition of spectral components in order to obtain a watermarked digital image (I').

* * * * *

UNITED STATES PATENT AND TRADEMARK OFFICE
CERTIFICATE OF CORRECTION

PATENT NO. : 6,944,313 B1  
APPLICATION NO. : 09/348502  
DATED : September 13, 2005  
INVENTOR(S) : Ioana Donescu It is certified that error appears in the above-identified patent and that said Letters Patent is hereby corrected as shown below:

ON THE TITLE PAGE  
(Item 56), References Cited, OTHER PUBLICATIONS, second entry, "Mathod" should read --Method--.  
(Item 56), References Cited, OTHER PUBLICATIONS, fourth entry, "J. J K. O Ruanaidhn" should read --J.J.K. O Ruanaidhn--.  
(Item 56), References Cited, OTHER PUBLICATIONS, fifth entry, "pp. 548-551" should read --pp. 548-551,--.  
(Item 56), References Cited, OTHER PUBLICATIONS, seventh entry, "congress" should read --Congress--.

SHEETS OF DRAWING FIGURES  
Sheet 1, Figure 1, "Encodeur" should read --Encoder--.  
Sheet 5, Figure 6, "Level 1detail" should read --Level 1 detail--.  
Sheet 6, Figure 7, "component $I_{ij}$" should read --component $I_{ij}$--, and "$l'_{ij}=l_{ij}+\alpha w_k$" should read --$I'_{ij}=I_{ij}+\alpha w_k$--.  
Sheet 7, Figure 8, "E3" should read --E32--, and "$l'_{ij}=l_{ij}+\alpha w_k$" should read --$I'_{ij}=I_{ij}+\alpha w_k^2$--.  
Sheet 8, Figure 9, "breadkown" should read --breakdown--.  
Sheet 9, Figure 10, "$(l'^*_{ij}-l_{ij})$" should read --$(I'_{ij}*-I_{ij})$--; "E1" should read --E11--; and "$I_{ij}/I^*_{ij}$" should read --$I_{ij}/I_{ij}*$--.

Sheet 10, Figure 11, "$(l'^*_{ij}-l_{ij})$" should read --$(I'_{ij}*-I_{ij})$--; "sequence W" (first occurrence) should read --sequence W*--; and "$I_{ij}/I^*_{ij}$" should read --$I_{ij}/I_{ij}*$--.  
Sheet 11, Figure 12, "calculatio n of α" should read --calculation of α--.  
Sheet 12, Figure 13, "Pseudo-ramdom" should read --Pseudo-random--.

COLUMN 5  
Line 22, "a means" should read --means--.

COLUMN 6  
Line 67, "data." should read --data;--.

COLUMN 9  
Line 14, "consist" should read --consists--.

UNITED STATES PATENT AND TRADEMARK OFFICE
CERTIFICATE OF CORRECTION

PATENT NO. : 6,944,313 B1
APPLICATION NO. : 09/348502
DATED : September 13, 2005
INVENTOR(S) : Ioana Donescu It is certified that error appears in the above-identified patent and that said Letters Patent is hereby corrected as shown below:

COLUMN 15
Line 6, "interval]0,1]" should read --interval [0,1]--.

COLUMN 17
Line 21, "wk" should read --$w_k$--.

COLUMN 19
Line 30, " $w_k^* = \frac{1}{a}(l'_{ij}{}^* - l_{ij})$ " should read -- $w_k^* = \frac{1}{a}(l'_{ij}{}^* - l_{ij})$ --.

COLUMN 20
Line 53, "(N/2$^d$xN/2$^d$)/2" should read --(N/2$_d$xN/2$_d$)/2.
Line 63, "interval ]0,1]." should read --interval [0,1].--.

COLUMN 22
Line 48, "wk" should read --$w_k$--.

COLUMN 23
Line 65, "step E111," should read --step E111,--.

COLUMN 24

Line 31, " $w_{k*} = \frac{1}{a}\left(\frac{X'_{k*} - X_k}{X_k}\right)$ ,, should read -- $w_k^* = \frac{1}{\alpha}\left(\frac{X'_k{}^* - X_k}{X_k}\right)$ --, and Line 50, "wk" should read --$w_k$--.

UNITED STATES PATENT AND TRADEMARK OFFICE
CERTIFICATE OF CORRECTION

PATENT NO. : 6,944,313 B1
APPLICATION NO. : 09/348502
DATED : September 13, 2005
INVENTOR(S) : Ioana Donescu It is certified that error appears in the above-identified patent and that said Letters Patent is hereby corrected as shown below:

COLUMN 28
Line 28, "of" should read --of:--.

Signed and Sealed this

Third Day of June, 2008

JON W. DUDAS
*Director of the United States Patent and Trademark Office*